US006590573B1

(12) United States Patent
Geshwind

(10) Patent No.: US 6,590,573 B1
(45) Date of Patent: Jul. 8, 2003

(54) INTERACTIVE COMPUTER SYSTEM FOR CREATING THREE-DIMENSIONAL IMAGE INFORMATION AND FOR CONVERTING TWO-DIMENSIONAL IMAGE INFORMATION FOR THREE-DIMENSIONAL DISPLAY SYSTEMS

(76) Inventor: David Michael Geshwind, Two Lincoln Sq., New York, NY (US) 10023

(*) Notice: Subject to any disclaimer, the term of this patent is extended or adjusted under 35 U.S.C. 154(b) by 0 days.

(21) Appl. No.: 07/951,267

(22) Filed: Sep. 25, 1992

Related U.S. Application Data

(63) Continuation-in-part of application No. 07/435,487, filed on Aug. 17, 1989, now abandoned, which is a continuation-in-part of application No. 07/006,291, filed on Jan. 20, 1987, now Pat. No. 5,050,984, which is a continuation of application No. 06/601,091, filed on Apr. 20, 1984, now abandoned, which is a continuation-in-part of application No. 06/492,816, filed on May 9, 1983, now Pat. No. 4,606,625, said application No. 07/435,487, is a continuation-in-part of application No. 07/227,403, filed on Dec. 17, 1986, now Pat. No. 4,925,294, application No. 07/951,267, which is a continuation-in-part of application No. 07/077,916, filed on Jul. 27, 1987.

(51) Int. Cl.[7] .............................................. G06T 15/00
(52) U.S. Cl. ....................... 345/419; 345/473; 345/582; 345/589; 348/51; 353/7
(58) Field of Search ................................. 395/119, 109, 395/122, 129; 340/710, 734; 358/3; 348/51; 353/7; 345/473, 582, 589, 167, 184

(56) References Cited

U.S. PATENT DOCUMENTS

| 4,475,104 A | * | 10/1984 | Shen ........................ 340/729 |
| 4,697,178 A | * | 9/1987 | Heckel ...................... 395/122 |
| 4,925,294 A | * | 5/1990 | Geshwind et al. ............ 352/57 |
| 4,933,670 A | * | 6/1990 | Wislocki .................... 345/167 |
| 5,177,474 A | * | 1/1993 | Kadota ................... 395/119 X |
| 5,181,181 A | * | 1/1993 | Glynn ....................... 364/566 |
| 5,185,852 A | * | 2/1993 | Mayer ....................... 395/109 |
| 5,237,647 A | * | 8/1993 | Roberts et al. ............ 395/119 |
| 5,341,462 A | * | 8/1994 | Obata ....................... 395/122 |
| 5,347,620 A | * | 9/1994 | Zimmer ..................... 395/129 |

OTHER PUBLICATIONS

Hanrahan et al., "Direct WYSIWYG painting and texturing on 3D shapes", Computer Graphics, vol. 24, Issue 4, pp. 215–223. Aug. 1990.*

Grossman, "Look Ma, No Glasses", Games, Apr. 1992, pp. 12–14.*

Slinker et al., "The Generation and Animation of Random Dot and Random Line Autostereograms", Journal of Imaging Science and Techmology, vol. 36, No. 3, pp. 260–267, May 1992.*

* cited by examiner

Primary Examiner—Mark Zimmerman
Assistant Examiner—Lance W. Sealey

(57) ABSTRACT

Disclosed is an illustrator- or painter-operated, computer-mediated system for creating binocular, stereoscopic images from 2-D and 3-D image elements created by the operator or imported into the system. Depth effects are synthesized by creating parallax offsets which are applied to the display positions of the various elements in the view presented to each eye. The magnitude of the offset for each object is related to the depth of that object, the direction of the offset is related to which eye the view is intended for. A 3-D input device is described as a system component which may be used to control such a system. Additional techniques are disclosed whereby digital information so created may be displayed, broadcast, or utilized in a virtual reality system.

109 Claims, 6 Drawing Sheets

0

+1

-1

+2

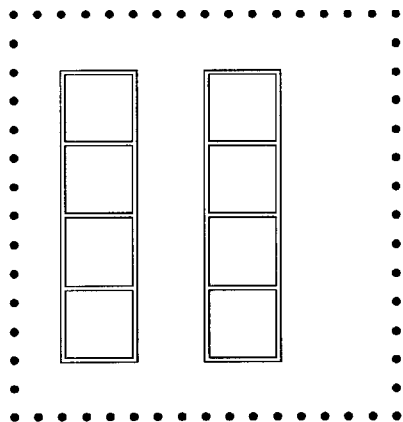
+20
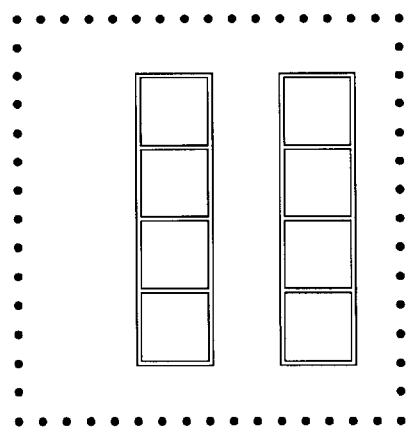
FIGURE 2E

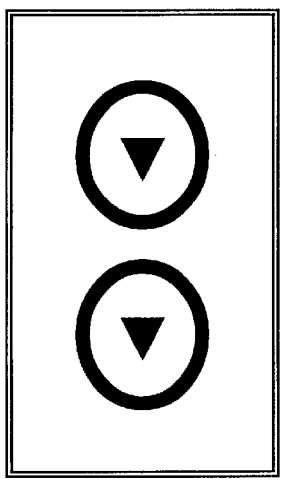

FIGURE 3A: Vertical (Y) Mode — both balls move in the same direction, opposite to mouse movement. Similar to standard mouse mode.

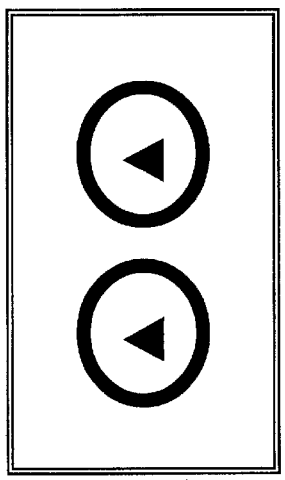

FIGURE 3B: Horizontal (X) Mode — both balls move in the same direction, opposite to mouse movement. Similar to standard mouse mode.

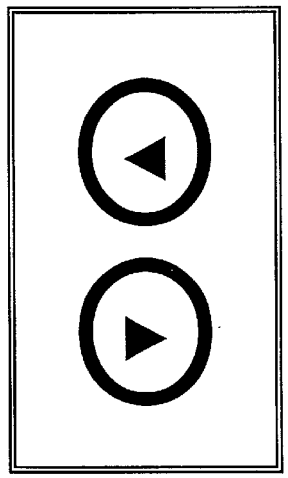

FIGURE 3C: Twist (Third Axis) Mode — the two balls move in opposite (roughly) horizontal directions. Unlike any standard mouse mode.

INTERACTIVE COMPUTER SYSTEM FOR CREATING THREE-DIMENSIONAL IMAGE INFORMATION AND FOR CONVERTING TWO-DIMENSIONAL IMAGE INFORMATION FOR THREE-DIMENSIONAL DISPLAY SYSTEMS

The instant invention is a continuation-in-part of the applicant's application Ser. No. 07/435,487. This application is a continuation-in-part of applicant's application Ser. No. 07/227,403 now issued as U.S. Pat. No. 4,925,294 and also of application Ser. No. 07/006,291 now issued as U.S. Pat. No. 5,050,984 which was a continuation of Ser. No. 06/601,091 which was a continuation-in-part of application Ser. No. 06/492,816 now issued as U.S. Pat. No. 4,606,625. The instant invention is also a continuation-in-part of applicant's application Ser. No. 07/077,916. All of the above referenced applications and patents are hereby incorporated in their entirety by reference.

TECHNICAL FIELD

The instant invention relates to an operator's interactive computer workstation for the conversion of two-dimensional motion pictures, video or other image information for three-dimensional display or viewing systems, as well as for the creation and integration of three-dimensional image information. As,such, this application relates to specific details of additional embodiments and improvements to the systems described in and co-invented by the instant applicant as, U.S. Pat. No. 4,925,294 and the systems described in applicant's U.S. Pat. Nos. 4,606,625 and 5,050,984.

PRIOR ART

There exist a number of true three-dimensional, stereographic, binocular display systems, including: separate CRT displays for each eye, often routed through prisms or by mirrors, or mounted in a helmet sometimes with orientation sensors; and glasses with red and green or mutually polarized filters over the left and right eyes, for use with film or video displays.

Many video displays, including home televisions, work with an interlaced raster image where each image frame is divided into two fields, with the even lines displayed first followed by the odd lines (or vise versa). For US and Japanese systems the frame rate is 30/sec and the field rate is 60/sec; in Europe the rates are 25 and 50 respectively; for many industrial applications the rate is doubled to 60 and 120 respectively; and, many other rates are available or possible.

It is thus possible to form a stereoscopic 3-D display by creating a left and right image pair interleaved into the even and odd fields (or visa versa) of a video display, and viewing that display through LCD shuttered glasses which are flickered (180 degrees out of phase for each eye) in synchrony to the field rate of an interlaced video display, separating two 'field' images from a single video 'frame' signal.

U.S. Pat. No. 4,952,594, of which the applicant is a co-inventor, describes a method for creating and modifying 3-D program material derived from already existing 2-D motion picture films and video, and other information; including a system to produce such material.

'Paint' and similar interactive programs permit an artist or operator to create 2-D paintings, drawings, illustrations and business, technical and industrial graphics on computer systems.

SUMMARY OF INVENTION

The instant invention relates to techniques and devices for creating and/or delivering 3-D (stereoscopic, binocular, holographic, serial or otherwise) image information which may be derived from 2-D images or image elements converted to 3-D by the system, 3-D image elements created by the system, or integrated with pre-existing 3D image information created independent of the system.

The primary system component is an interactive 3-D computer paint system which shares many elements with 2-D computer paint systems, but which extends those elements suitably to deal with 3-D image information. User interface elements such as menus, buttons, palettes, cursors, and information windows may be placed in the Z or depth direction (perpendicular to the plane of the display screen) as well as in X (horizontal) and Y (vertical); these elements may also have size or 'thickness' in the Z direction. In addition to image information (R, G & B or indexed colors) depth information may be stored with pixels in order to implement 3-D painting and processing functions. In this way, when further painting is to be performed at a particular pixel, the depth to be painted and the depth of what is already stored there may be compared; and, painting would only be accomplished if the new information was closer to the viewer than (and should thus obscure) what was already there.

Further, when painting, or other image manipulation or processing, functions are to be performed, they are performed on two separate images; one for the left eye and one for the right. However, the application of the function in each picture is offset in the horizontal direction by the appropriate parallax offset. The two images may then be interleaved for 3-D display. Thus, many standard 2-D painting and image processing algorithms may be applied, separately to each picture, without having to re-design or re-program them for interleaved 3-D images.

Techniques are disclosed for preparing such images for display with anaglyphic, LCD-shuttered, or new types of flickering glasses; or for broadcast by dual channel video systems. In addition, it is disclosed how such information may be adapted for use with virtual reality systems.

Additionally, system components are disclosed which permit the input, by a human operator, of more positional information than simply X and Y position, yet which may be constructed by combinations of simple X-Y transducers or other input elements used in combination.

BRIEF DESCRIPTION OF DRAWINGS

FIG. 3 depicts two-ball (3-D) mouse operational modes.

SCOPE OF INVENTION

Figure 1A:
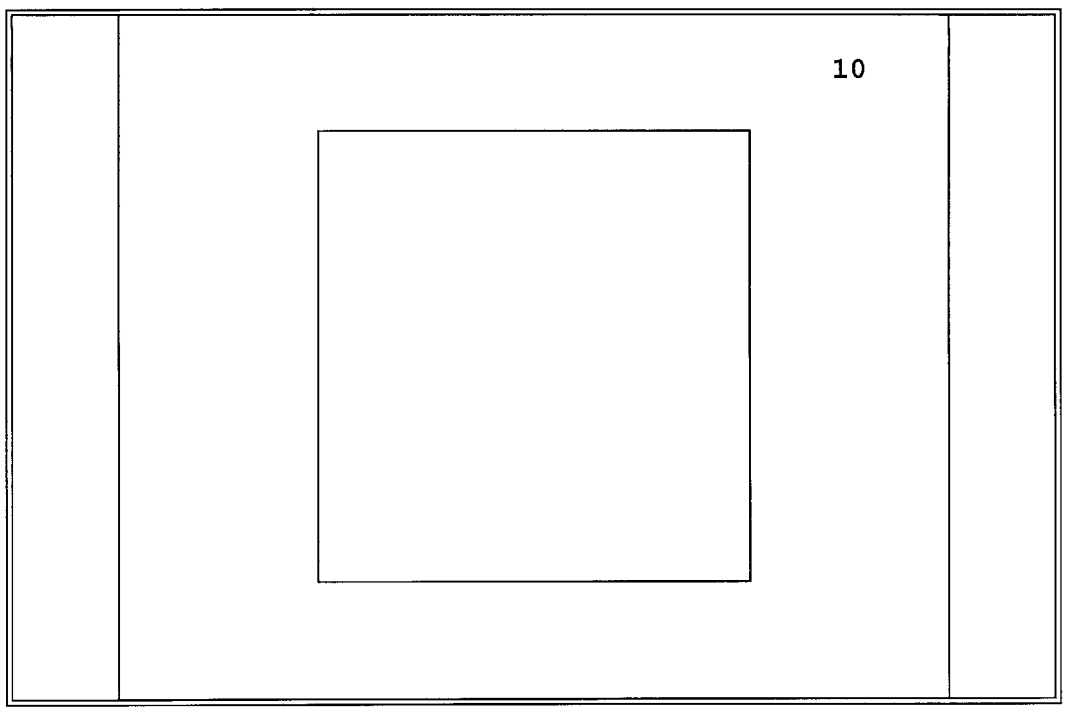
FIG. 1 depicts the use of a standard paint system and a specialized 'disinterleaving' imaging function to create stereoscopic images.

The instant invention relates to an operator's interactive computer workstation for the conversion of two-dimensional motion pictures, video or other image information for three-dimensional display or viewing systems. It may also be employed for the creation and processing of new 3-D image information, and for the integration of either type of image information with three-dimensional image information imported into the system.

For example (as described in U.S. Pat. No. 4,925,294), when converting a particular still frame of a 2-D motion picture to 3-D, gaps between image parts may develop. In the patented system, functions are provided that permit the operator to fill gaps in the converted motion picture by borrowing image information from other parts of the frame or from other frames in the sequence, or to create 'fill-in image information' by utilizing functions similar to known 2-D 'computer paint systems'. In the absence of a 2-D motion picture frame to convert, such functions may be utilized to create new 3-D images. As such, the system may be used as a '3-D Paint System' for creating non-computed (i.e., operator or 'hand' generated) 3-D paintings, technical illustrations, business graphics, or other operator specified graphics. In addition, such a system could also be used for adding image information to existing true 3-D images, including 3-D photographs and computationally generated binocular 3-D graphics. For example, circles, arrows, scales, axes and text notes may be drawn 'within the 3-D space' of a 3-D video display, in much the same way that a marking pen can be used to annotate on the surface of a standard 2-D photograph.

The technologies described herein may also be used, either in an illustrator operated system or more automatic system, for purposes of converting 2-D medical images to 3-D. In this way, traditional diagnostic and other medical images containing complex data may use the added depth dimension to enhance visualization and increase comprehension.

The embodiments described herein employ LCD shuttered glasses, synchronized to the field rate of an interlaced video display. Such a system may be used for both design and production of displayable and recordable end product on video. Similar systems may be designed around other stereoscopic or holographic display technologies; or, the system as described herein may be used by the operator to design images that will later be produced for display, viewing or recording by any 3-D means currently in use or later developed. Such variations are considered to be within the scope of the instant invention.

A number of system components or techniques mentioned herein—such as: stereoscopic systems of various kinds; computer graphic devices, including frame buffers; interactive computer graphic software systems such as 'paint systems'; or, techniques, such as 'Z-buffering'—already exist and may be the subject of patents or other publications. The literature on such elements is well developed and the reader is directed to that literature for additional details of implementation. Although such components play a significant role in the instant invention, it is not the purpose of this application to claim the invention of such basic components or techniques. Rather, the subject of the instant application are composite designs and processes, which employ and combine such existing components into novel and useful systems or for new purposes, as well as numerous additional technical details which, in and of themselves, are novel.

A number of techniques will be described and/or claimed as being embodied in either digital hardware or software. It is often possible to simulate or mimic the functionality of special-purpose hardware, within an environment of general purpose hardware, by the coding of control software. It is intended that all of the techniques and functional structures described herein may be embodied as either: specially constructed hardware; general purpose hardware with the appropriate software; or, any combination of the two. Similarly, a number of electronic functions may be embodied as either digital or analog circuitry; and, various display technologies—such as photographic or other film, holographic film or display, lenticular screens, HDTV, plasma panels, stationary or moving LEDs or LCDs, etc.—may be substituted for video displays. It is intended throughout that these and similar substitutions, combinations or hybridizations are within the scope of the instant invention, even though not specifically stated below.

The term '3-D Computer Graphics' is often used to describe the rendering of a 2-D projection of a 3-D or 'solid' mathematical model onto the plane of the computer display screen. Such images can be quite sophisticated, taking complex lighting, shading, shadows and reflections into account, and the computational techniques for such rendering are highly developed. However, such '3-D Graphics' are 3-D only in the computational sense and result in a single 'monocular' 2-D image. In contrast, as used herein, the term 3-D will generally be used to mean binocular, stereoscopic or holographic images which exhibit depth characteristics when viewed.

It is also possible to create two 2-D computer rendered images from 3-D models, such that the perspective view of each corresponds to the view as seen by the left and right eye of the viewer. Such image pairs may be displayed by true 3-D display systems to achieve synthetic stereoscopic imagery. Such displays are sometimes used for entertainment purposes, but more often for industrial applications such as CAD or flight simulators. Such straight forward 'solid model' rendering—even if made in stereoscopic pairs—is, generally, not being claimed as part of the instant invention. Rather, the instant invention relates to an interactive system which permits the operator to use 'painterly' functions to create 'true 3-D' images, exhibiting a sense of depth.

Lastly, discussion of vertical parallax will be omitted here, for the sake of simplicity and clarity. However—especially for objects close to the viewer, on the order of the interocular distance—noticeable vertical parallax or differential obscuring may come into effect. The same principles and techniques described herein for the horizontal case may be applied in the perpendicular direction, as and if desired, and are considered to be within the scope of the instant invention.

DESCRIPTION OF INVENTION

As described in applicant's U.S. Pat. No. 4,925,294, 2-D image elements may be relatively offset and combined with other image information elements to create 3-D images. A computerized system for creating such images is described herein.

Three Display Schemes

In one basic embodiment, the instant invention may be implemented using standard, off-the-shelf hardware and software components, with the addition of specialized software functions and the careful application of production techniques. A standard 'paint' program, operating on a standard interlaced video computer display (frame buffer), may be used to convert separate 2-D image elements into a 3-D composite as follows.

In FIG. 1A, the rearmost image element (10, a hollow square in this example), called plane zero or P0, is brought into the frame buffer by running a standard 'image load' function of the paint software, or may be created using computer paint functions. In general, this P0 element should contain image information (even if it is only a 'blank' background) to fill the entire area of interest; but, this area may be somewhat smaller than the entire display, as will be made clear below, to take into account left/right image shift.

When P0 is viewed through LCD shuttered glasses, the even/left image field and odd/right image field will register perfectly. There will be no differential shift or parallax and, thus, no depth effect. This 'neutral' depth plane will appear to be at the plane of the front of the CRT which will also be perfectly registered between the left- and right-eye views.

Figure 1B:
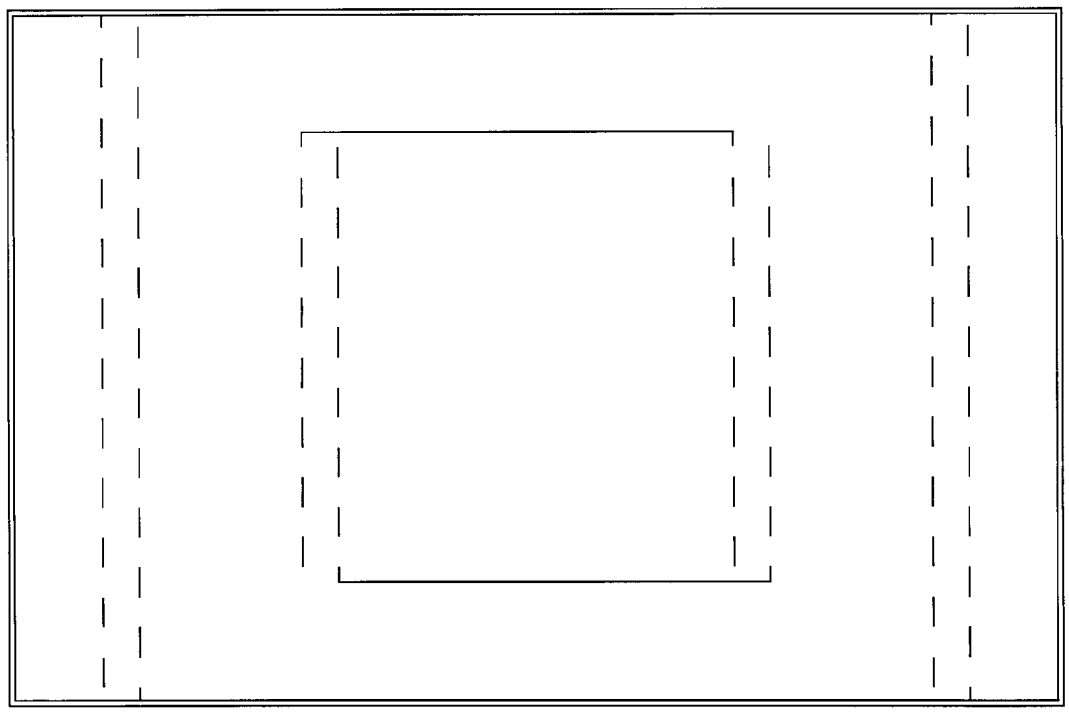

At this point, a special software function is invoked. If the paint system software that is used does not permit calling a user specified outside function, it may be necessary to exit the paint software, run this special function, and then re-enter the paint program. This function will shift the even/left-eye field lines of the image in one direction by an amount S0 and the odd/right-eye field lines in the other direction, generally by the same amount. See FIG. 1B. (Note: the even/left—odd/right relationship may be as stated or reversed to odd/left even/right; only consistency is important.) This will cause the image plane to appear to move closer to (if S0 is 'positive') or further from (if S0 is 'negative') the viewer, by an amount D0, due to the parallax between the two interleaved images. The larger S0 is made, the more the image plane will appear to be moved in the direction perpendicular to the CRT plane, the 'Z' direction. For the purpose of this discussion, the rearmost planes will be moved progressively further away from the viewer at each stage.

Figure 1C:
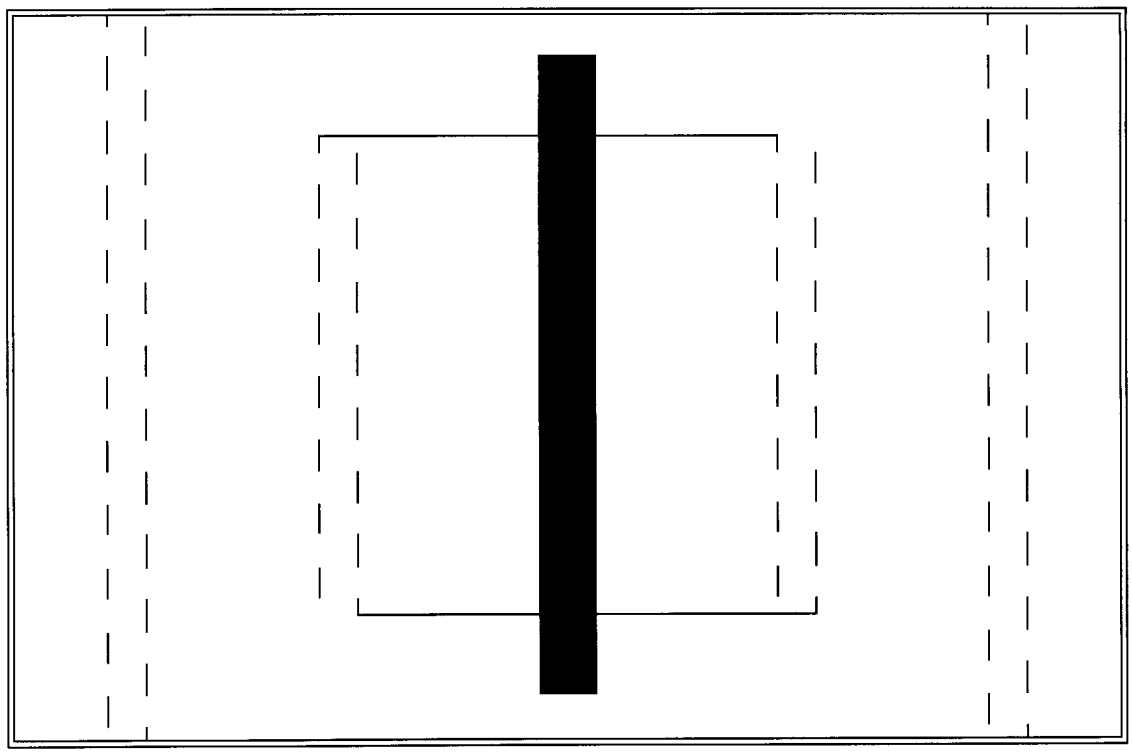

In FIG. 1C, the standard paint software is then used to load or paint a next-closer 2-D image plane, P1, (11, a vertical bar in this example) which may also have been derived by separating it from a 2-D motion picture frame, as in applicant's patent '425. This and later, more forward elements will, in general, be loaded with part of the image area 'transparent' (or painted/created with 'holes') allowing P0 or other relatively rearward planes to be seen through them. When images are stored as files, transparency is often denoted by storing a particular numerical 'color' at those portions, often (0) for indexed or 'color-mapped' images, or (0,0,0) for full-color, R-G-B images.

Figure 1D:
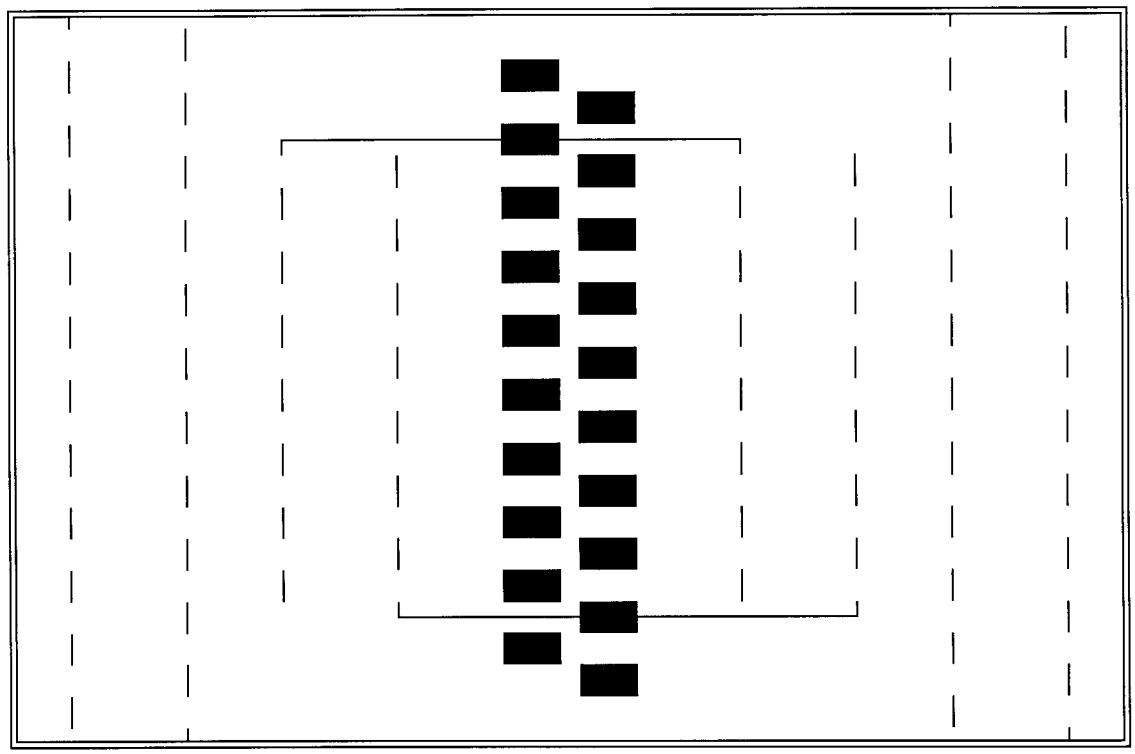

In FIG. 1D, the composite image, consisting of P0 offset by S0 and appearing to be D0 behind P1, is now offset in a similar fashion by the special software function, by an amount S1. Now P0 is offset a total of S0+S1, appearing D0 behind P1 and D0+D1 behind the face of the CRT; P1 is offset by S1 appearing D1 behind the face of the CRT. Note that, for certain circumstances, the apparent distances (Ds) may not, in fact, add linearly; but, the distances do accumulate, and the relative ordering of the planes is as described.

The process is repeated and many 2-D image planes are, thus, stacked-up, back-to-front, to form a multi-planed, 3-D image when viewed through the flickering glasses. The back-to-front order guarantees that obscuring of rearward layers, which will be different in the left and right images due to parallax offsets, is done correctly.

By progressively moving the composite image away from the viewer, or into the CRT display, the last, forward-most image plane will be at the front of the CRT and the full composite image will appear to be 'inside' the video display, similar to looking into a fish tank. By running the odd/even differential shifting function one last time, by an amount equal to S0+S1+S2+ . . . +Sn−1, but in the opposite direction, the rearmost image plane may be restored to the plane of the CRT face. See FIG. 1E. Thus, the composite image will then appear to come out of the CRT into 'room space'. This restoration process may be runpart way and arbitrarily set any position in the composite image (even between planes containing images) as the 'neutral' plane, without relative shift between the odd and even image fields.

In shifting image elements left and right, some image part may 'fall off the edge' of the frame buffer and be lost. As the image (which is spread, in opposite directions horizontally on alternate lines to create parallax, for alternating field stereo) is brought close to the edge of the screen, the field for one eye or the other will 'fall off the edge' first. This will leave part of the image visible on only alternate lines, for a single eye, creating a ragged edge. Alternately, depending upon the details of the hardware and software used, the image information may 'wrap-around' and incorrectly re-appear at the opposite edge of the frame buffer.

For this reason, the width of the area of the display used for imaging in this embodiment may best be made less, by the amount of the maximum shifts involved, than the maximum width of the display. To do this, the Z-Buffer may be initialized to a horizontally diminishing wedge to avoid images with ragged edges.

If the minimum increment is 2 pixels (a minimum of one offset in each direction) then to avoid ragged edges while painting, the last two usable pixel columns on each side must be avoided by the next farthest plane. This restriction continues, for further planes, loosing two additional on each side. This is true, starting from the '0th' or neutral plane, for both into and out of the screen, although parallax is reversed between the two cases.

Alternately, an extra wide frame buffer, providing non-visible pixels beyond the edges of the display area, may be employed and would permit the storage and restoration of those parts of image planes temporarily pushed off the edge of the display screen by the software shift function. Such a frame buffer would also avoid errors which could result from temporary wrap-around caused by shifting or unshifting the composite image. The AT-VISTA is an off-the-shelf display buffer for the IBM-PC that may be software configured to provide such capabilities.

If the functionality of a paint system may be modified or if a new '3-D Paint System' is programmed, the "layer-shift-layer-shift-layer . . . " process may be incorporated into the program.

Alternately, this process may be replaced by a more convenient functionality. This cumbersome process is required because a standard paint system 'paints' or performs its other imaging functions at the 'neutral' plane, where the odd and even image fields are not relatively shifted. In a preferred embodiment of the instant invention, the paint brush (and all other painting, graphic and imaging function such as: draw a line, circle, square, polygon, text or other graphic element; load, move, copy, or modify a portion of image; as well as all other traditional 2-D paint and graphic functions) would, itself, be programmed to have its odd and even image fields offset by a variable amount.

FIG. 2 shows a small square 4×4 pixel brush. In 2A the brush is set for the zero or neutral plane with no relative offset of the odd and even lines of the brush image. In 2B the odd and even lines are offset for plane 1; in 2C for plane −1; in 2D for plane 2; in 2E for plane 20.

Figure 2A:
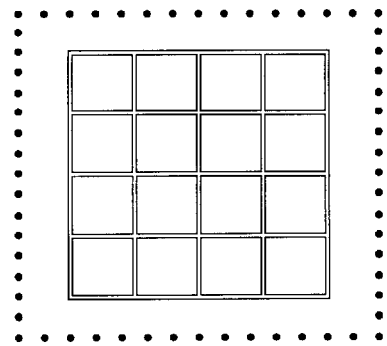
FIG. 2 depicts a 'disinterleaved' 4×4 pixel brush.
Figure 2B:
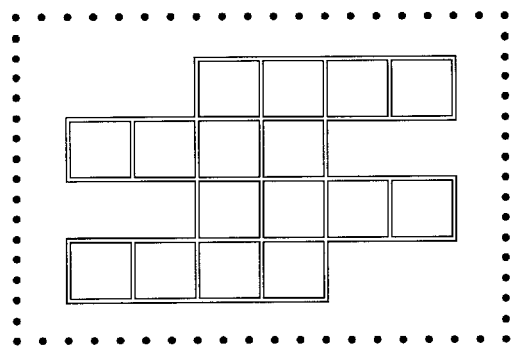
Figure 2C:
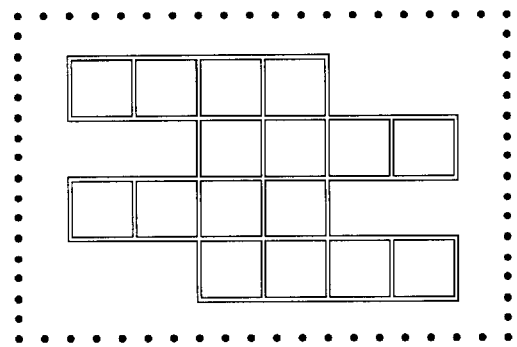
Figure 2D:
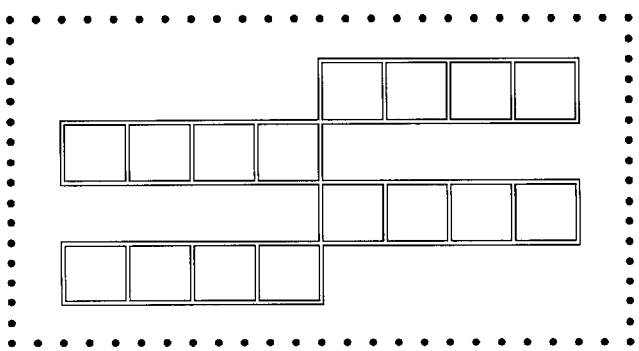
Figure 4A:
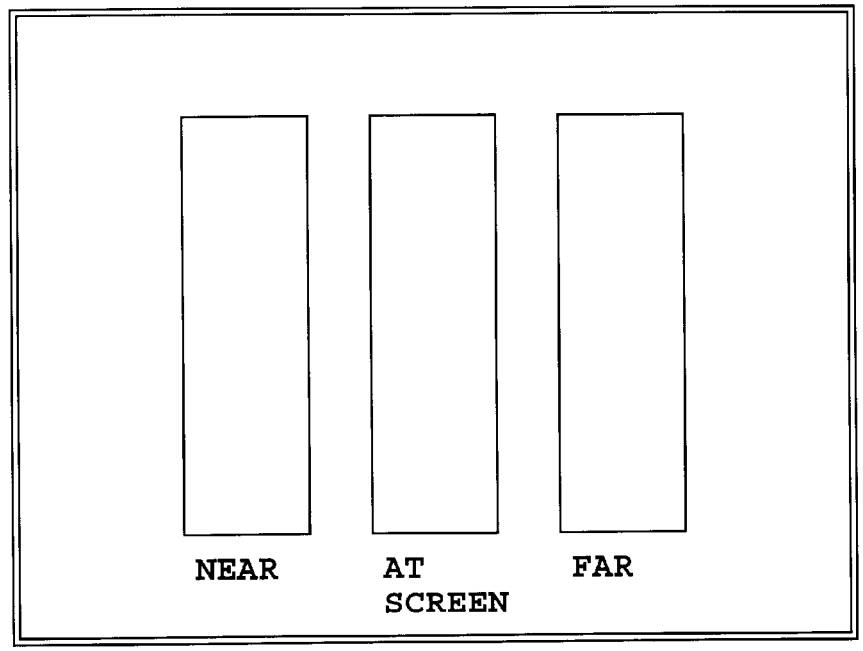
FIG. 4 shows the parallax offsets for near, far and screen depth information in the left and right images of a 3-D paint system.
Figure 4B:
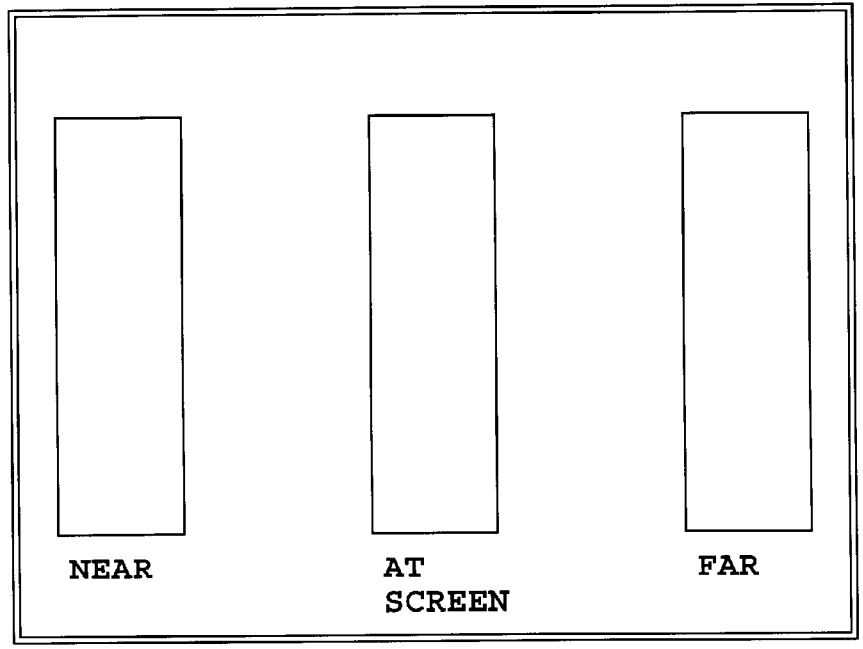

Although much more convenient to use, this technique does have a drawback to implementation. The separated brush and interleaved left and right images require that any painting function be applied separately to the odd lines and even lines of the frame buffer contents. Programming algorithms that are applied to non-continuous areas of frame buffer memory is both a conceptual and a computational complication. Additionally, the contents of many frame buffers are manipulated by transferring rectangular areas of the image to the computer for modification and then returning the data to display memory. The overhead of initiating a transfer is often very high compared to the transfer of each additional pixel. A 4×4 brush would require a single transfer of 16 pixels back and forth. A separated brush as shown in FIG. 2E would require 2 transfers of 12 pixels (21 and 22) or a single rectangle containing 176 pixels (23).

A third embodiment that eliminates or reduces the above problems can be implemented in some configurable display boards such as Truevision's AT-VISTA, which includes a 'row table' feature. These devices permit the programmed specification of which memory line will be displayed on the screen for each display line. In that case the left and right images can each be placed in continuous rectangular blocks of the display's memory. The display processor is programmed, however, to display these two images in interleaved fashion. The advantage is that all functions and algorithms can then be programmed to operate on (two) continuous rectangles of memory, rather than having to be made more complex in order to work with two interleaved views. Many standard, well-known and well-understood, and 'built in' functions can then be used as in standard computer paint systems, including: drawing of lines, polygons, etc.; digital filters, anti-aliasing and other image processing functions; color and pattern filling; etc. However each function will have to be applied twice, once to each image, and all X-coordinates must be offset in each image by a parallax value appropriate to the depth plane at which the function is to be applied.

Another advantage of this method is that different types of interleaved and non-interleaved display formats can be accommodated for different display systems from the same frame buffer memory content, just by changing the table that maps memory to display. For example, switching between left/even right/odd configuration and a left/odd right/even configuration only requires that the table entries be shifted down or up by one line; also, a pad entry may be made at the top or bottom, and one display line lost at the bottom or top. Similarly other display formats, such as those required for the StereoGraphics brand of high frame rate alternating stereo displays can also be easily programmed.

This third scheme is the preferred embodiment of the instant invention.

Three-Dimensional Positioning and 'Thickness'

With the later embodiments described above, the artist would be able to position the brush (or other imaging function) along the Z (depth) axis as well as the X (left to right) and Y (top to bottom) axes. In addition, the brush (or other imaging function) itself may have a depth 'thickness' or size, as well as a position.

The brush position, or size, along the Z-axis would be displayed as a cursor, positionable in all three dimensions, and may be controlled by any appropriate computer control mechanism now in use or later developed, including:

1. A depth palette may be provided, much like a standard color palette, that allows the artist to pick off a depth;
2. The above may be in the form of a depth 'ruler', as described below;
3. The artist may pick off a depth by pointing at a particular item or spot in the image;
4. A numerical value may be typed in at a keyboard;
5. A pen with a variable pressure tip (rather than the standard click-on tip) may be used to specify depth;
6. Other physical input transducers may be used, such as a knob, foot pedal, joystick, 'data glove', 3-D input device as described below, or other control or position sensor; or,
7. A graphic of a knob, slider or other control icon may be controlled by the artist; and additionally,
8. The computer may be programmed to compute a depth by: a depth value, depth tag, or other depth specification, stored with an image element; interpolation, either spatially over a frame, or temporally between frames; by image analysis of any type; or, as described below, by consulting a depth or Z-buffer.

Field and Frame Mode of Cursor Movement

Since the left and right pictures and the left and right brush are interleaved for display, into the odd and even fields of a video frame, moving up or down by a single display line reverses the relationship between which brush field is displayed in which picture. Thus, if, on even vertical cursor positions, the left brush is painted into the left image and the right brush is painted into the right image, on odd vertical cursor positions, the right brush is painted into the left image and the left brush is painted into the right image. However, the parallax shift also must be alternated or the brush will flip in and out of the screen on alternate lines.

If the above is termed Field Mode; a Frame Mode is also possible. In Frame Mode, the cursor position may only move in multiples of two lines vertically and, thus, the relationship between brush halves and picture halves is always preserved.

Three-Dimensional Image Processing Functions

In particular, it should be noted that image processing related 2-D painting functions, such as filtering, averaging, smearing, blurring or sharpening functions, usually are programmed to be applied to the pixels in a rectangular window or arbitrarily shaped matte, or to those pixels under the shape of the brush. For 3-D painting, these 2-D algorithms can be applied to a single plane, or may be generalized to be applied to all the pixels in a 3-D rectangular solid, other arbitrarily shaped 3-D volume or, in particular, within the volume of a 3-D brush shape.

The image processing algorithms may be generalized to 3-D form as well; for example, 'blurring' or 'softening' functions are often implemented as algorithms that "average the pixel values (often with weighting factors) within a given area" which, when generalized, would become "average all pixel values within a given volume". Alternately, one may choose to apply traditional 2-D image processing algorithms to individual 2-D planes that are 'stacked' in 3-D space, working only on the pixels at a specified depth or range of depths. In that case, when the computational kernel (neighborhood of pixels used to compute a particular pixel value) comes to an edge of an object in a particular plane, non-standard options arise. For example, those pixels that are in the kernel but not on a specified plane in question may or may not effect the computation; and may or may not be effected by the computation. Directional algorithms, for example bas relief, may or may not be reversed in the two eye views. Generally, based upon the depth at which a digital filter is to be applied, the center of the kernel will be horizontally displaced by the parallax offset differently for each eye view. In general, the differential layering of image elements in the two eye views will yield different results when digital filters are applied. Alternately, if the 'hidden' pixels of an image element on a particular plane are still available to the computer, the digital filter kernel can be applied to both the visible and obscured pixels of a plane.

The Depth Buffer

The above describes a convenient usable system for creating and modifying stereoscopic images. However, the 3-D effect depends not only on horizontal parallax, but on the proper obscuring (which is subtly different for each eye)

of rearward image elements by forward image elements. If the visual cues of parallax and obscuring are inconsistent, confusion results and the perception of 3-D is destroyed. By painting from back to front, one may guarantee that this aspect is properly handled; but, this is inconvenient and would interfere with the creative process by unduly restricting the freedom to paint and modify an image in arbitrary order. An alternate embodiment, wherein depth information, in addition to display color information, is stored for image pixels, takes care of this problem and is described below.

For many standard computer graphic display devices—full color displays—memory planes are provided for storing Red, Green and Blue values at each pixel; each pixel may have an independently specified color. Alternately, for color-mapped devices, a single number is stored at each pixel and is translated into Red, Green and Blue values by using it as an index into tables of Red, Green and Blue values—called color look-up tables or color maps—with all pixels sharing a common index displayed as the same color.

In addition to the Red Green and Blue (or Index) information for each pixel, it is common to store additional information in other memory planes. One, three, eight, sixteen or more memory planes (corresponding to the number of bits per pixel) of additional information may be provided, with eight being very common for moderate cost computer displays; often with 32 bits per pixel being assigned as eight bits each for Red, Green, Blue and Alpha (a non-displayed channel). The Alpha channel is traditionally used for a number of purposes which can include: overlay information (e.g., text or menus); video keying or (soft) matting of the computer display signal with another signal; masking off parts of the display from further processing; temporary storage of items such as menus, icons or palettes—or, of the parts of images obscured by those items; and, pixel transparency.

For computer rendering of 2-D images of '3-D solid' (but not stereoscopic) mathematical models, depth information is sometimes stored for each pixel to facilitate the proper display of many intersecting objects. Rather than trying to compute the correct intersection of diverse objects, the pixels of each object calculated are only put into the display if they are closer to the viewer than the equivalent pixels already contained in the frame buffer, thus automatically creating the proper intersection between, and obscuring of, objects without their direct computation. Such a depth memory plane is often called a Z-buffer. It is most often 16 or more bits deep, in order to provide enough resolution (2 raised to the 16th power, or roughly 64 thousand divisions) for the proper mathematical placement of objects in the computer's simulated 3-D (but still displayed as 2-D) environment.

While a 16-bit buffer may be used in the embodiment of the instant invention under discussion, an eight-bit Alpha channel may also be used to store depth information to great advantage, even though eight bits provide a resolution of only 256 values. Eight bits of non-display memory is routinely available for computer paint systems while 16 extra bits is not. A detailed discussion follows.

While 256 divisions may not be sufficient to specify the depth of a particular object in a simulated mathematical space, in the instant invention 2-D image layers are often stacked up and differentially shifted, to create a stereographic display. These 2-D image layers may be ordered and each assigned a depth or D value. This D value does not need to represent an exact depth value, just an ordering. The differential odd/even field left/right offsets will have to be calculated correctly for an exact depth value; but for obscuring, only an order is required. Thus, the much cruder resolution afforded by 8 bits can be used for the instant invention. For the purposes of this application, the use of a depth channel will be referred to as a D-buffer.

In the simplest embodiment, when loading or creating a layer, in addition to the differential offset function, for each pixel, the pixel value will only be used to replace the R-G-B values already stored for that pixel in the frame buffer if the new pixel's depth is closer to the viewer and, therefore, should obscure that which is behind it.

For more flexibility, the depth range behind, equal to, and in front of the selected depth for painting may be treated separately and pixel-by-pixel replacement for each range may be individually permitted or not. Not all combinations will make sense, but may still be used for effect. Additionally, individual depth planes, or ranges of depths may be protected from replacement or not. (See section on "Protection".)

Interpretation of Depth Values

For each possible D-buffer value, the value may represent the actual depth. Alternately, a number may be associated with each which indicates the actual depth which will be used to offset the pixels of that plane; in effect a depth look-up table or depth map, analogous to a color map. (Note that non-standard hardware or special software may be required to implement some of the following techniques.) Thus, the 256 planes specifiable with an 8-bit D-buffer do not need to be evenly spaced, and may be positioned with arbitrary resolution in the depth direction. When D-buffering is to be done on a point-by-point basis for generally shaped objects, rather than for just parallel planar elements, non-linear spacing may be particularly useful.

In general, this approach is useful and eliminates much of the reason why 16 bits are often considered as required for Z-buffering. Sixteen bits are usually required because the space between 'nose close' and (for all intents and purposes) infinity needs to be divided into many segments if they are to be of uniform size. If too few segments are used, an aliased or chunky effect will result when trying to effect intersections between objects.

For example, if working from the screen plane into room space, the relative left and right shift required for two objects separated by a few inches will be very great if the two objects are close to the viewer; but, the left and right shift required for two objects separated by a few inches will be virtually identical if the two objects are far from the viewer. Therefore, to correctly correspond to roughly uniform parallax offsets (the S shifts) between consecutive D-values: close (to the viewer) consecutive D-values may be separated by inches or even fractions of inches; consecutive mid-range values may be separated by several inches to feet; and, consecutive far-range values may be separated by many feet in 'scene space'. Uniformly spacing by equal 1/D values in the D direction is one way that may be used to advantage for simulating true 3-D perspective. In this way, a relatively small number of possible D values may be used effectively.

So far, only planes parallel to the screen have been discussed. In addition, as described in U.S. Pat. No. 4,925,294, certain stereographic elements will not be in planes parallel to the CRT faceplate. They may be tilted planes or 3-D 'sculpted' elements. In that case there may be several planar elements with most of the D-values reserved for non-parallel or non-planar elements. As an example, if three depth values were reserved for three background planar elements, and three more for three for foreground planar element, that would still leave about 250 values for tilted-planar or sculpted elements.

Another embodiment provides additional flexibility. Assume that a D-buffer containing 8 bits per pixel is available, although the same basic idea could be used for other numbers of bits per pixel. The 8 bits will be split into two segments: the upper or most significant 3 bits (providing 8 possible numbers 0 through 7) will be reserved as a 'tag'; the lower or least significant 5 bits (providing 32 possible numbers 0 through 31) will be used for a 'value'.

In this example, tag 0 will be reserved for planar objects parallel to the screen. For planar elements the value will represent the depth of that plane and can be used, as is, for obscuration purposes. However, for flexibility and added precision and, in particular, for interaction with other non-parallel-planar elements, the actual depth value used to create parallax may be stored in a look-up table. Each of the 32 entries in that table would be indexed to one of the 32 possible values for planar entries as described above. The depth assigned to a particular pixel would thus be derived by using the value stored at that pixel as an index into the depth table. Thus, all the pixels associated with a planar element could be moved by changing a table entry rather than by changing the value at each pixel. More than one planar element could thus be assigned the same depth. If overlap occurs, then an ambiguous situation results. The tag numbers could be used to arbitrate the conflict. Alternately a second table (an O-look-up table) could be constructed to store ordering or obscuring information to be used all the time, or only in conflict situations. In general two separate 'depth' designations can be maintained: one, a 'distance' value would be used to determine parallax offsets; the other, an 'ordering' or 'priority' value would be used to determine which objects obscure other objects.

Tags 1 through 7 would each be reserved for a tilted or 'thick' image element. In these cases, the 32 possible values could be interpreted differently than as described above, with several alternatives:

1. The 32 values associated with a particular tag could themselves be interpreted as actual depth values.
2. The 32 values associated with a particular tag could themselves index a table of actual depth values (as described above), providing an image element whose individual pixels were distributed at up to 32 depths. A second order table could also be used.
3. The 32 values could index a table of relative depth values, providing (probably fairly small) depth offsets from a positioning depth value also associated with the tag. The depth value for each pixel of the image element is calculated by adding the offset table entry associated with the value for that pixel, from the table associated with the pixel's tag, to the depth position also associated with that tag. In this way the element, once its 'depth shape' at each pixel were defined, could be repositioned just by changing the one position depth rather than by changing the entire table or, worse, the depth (tag +value) stored at each pixel of the element.

The position could be a single value representing the back, front or middle of the element. It may also consist of several numbers representing, for example, front and back, or position and thickness. In this way the element could be both positioned and stretched in the depth direction by changing only two values.

Other variables associated with a tag could indicate how the table values were to be interpreted: as actual values, table indexes, or relative offsets (1, 2 and 3 above); positive, negative or signed; linear, 1/linear, exponential or other non-linear function; etc. The interpretation of the values may also change as the position brings the element closer to or further from the viewer. That, in turn, may depend on the focal length of a virtual camera or an actual camera used to photograph a flat image to which depth is to be added.

Image elements that are planar, but tilted with respect to the face of the display, may be handled as thick or sculpted elements as described above. However, particularly for tilted planes that extend over a wide range of depth values, the limited number of possible values may produce a series of strips parallel to the face plate, rather than a smooth plane. Such planes may be marked as such with their tag and handled as a special case. By storing positions for the edges or corners of a rectangle, and applying the parallax rules to those positions, a pair of continuous smooth image elements may be created for the left- and right-eye views by interpolating between those edges or corners. Because of the simple geometry associated with tilted planes, a precise depth for each pixel may be easily calculated for the purposes of proper obscuring with other image elements stored with D-values at each pixel. By using a matte (perhaps stored in the now unused value portion, or stored as a separate raster image element), or by designating one 'transparent color', the image element associated with the tilted plane need not be rectangular, but may be given an arbitrary outline. Those pixels on the plane, but outside the matte, would thus be ignored for both display and obscuring.

Horizontal Resolution

Video displays in most computers, and the data files meant to be displayed thereupon, are often in the range of 512 pixels horizontally by 486 lines vertically. Other often used horizontal resolutions are 640, 768 (or 756, with six null, black or transparent pixels on each side) or even 1024 or 1280. Straightforward embodiments use offsets on pixel boundaries and, therefore, the minimum horizontal parallax shift between planes adjacent in the depth direction is one pixel (usually two pixels, one each in opposite directions for the left and right images) and, particularly at the lower end of these horizontal resolution figures, this does not permit separate planes or parts of objects to be closely spaced.

The current embodiment of the system utilizes the AT-VISTA display board which can be configured at many different resolutions, including a relatively high 1008 pixels horizontally (which may be increased to a nominal 1536). When importing images painted, rendered or scanned at more usual resolutions, data pixels are repeatedly loaded into the higher resolution display's memory locations.,For example, with 512-pixel resolution images, into a 1536 pixel wide screen, each pixel would be displayed three times; and for 768-pixel resolution images each pixel is displayed twice. With 1024-pixel resolution images each data pixel is used for 3/2 display pixels, which is implemented by loading data pixel N in display pixel M, data pixel N+1 in display pixel M+2, and a 50/50 mix of data pixels N and N+1 in display pixel M+1. A similar interpolative scheme is used to load 640-pixel resolution data into the 1536-pixel resolution display. Each group of 5 data pixels (A through E) must be apportioned into 12 pixels (1 through 12) as follows:

| | | |
|---|---|---|
| 1 = A | 2 = A | 3 = 0.4A + 0.6B |
| 4 = B | 5 = 0.8B + 0.2C | 6 = C |
| 7 = C | 8 = 0.2C + 0.8D | 9 = D |
| 10 = 0.6D + 0.4E | 11 = E | 12 = E |

Similar interpolative schemes can be used to covert between other resolutions. It should also be noted that when data with relatively wide pixels is to be displayed in a frame buffer of relatively narrow pixels, it may be parallax offset by multiples of the narrower display pixel, rather than the wider data pixel, to achieve finer depth effects.

The reverse process can be used to derive interleaved or separate left and right images from the higher resolution 3-D display. For example three pixels of the 1536-pixel resolution image would be combined and averaged to a single storage pixel of a 512-pixel resolution data file.

The contradictory needs for high-resolution (many small pixels) to achieve small parallel offsets, and low-resolution (fewer larger pixels) for economy of storage and display, may both be addressed by a frame store where pixels of different sizes may be displayed at different parts of the same image at the same time. Such a frame store is described in applicant's co-pending U.S. patent application Ser. No. 07/077,916 of which this application is a continuation-in-part.

Sub-Pixel Positioning

Information may be loaded into a display, either from a pre-existing image or from the 'brush' of a paint system; it may be loaded from information at the same resolution as displayed or (as described above) from a different resolution than displayed. In any of these cases the straight-forward approach leads to a minimum parallax offset between planes of one pixel which may provide widely spaced planes or parts of objects in synthesized 3-D space.

However, an interpolative technique, similar to that used to display information stored at different resolutions, may be used to provide sub-pixel positioning and, thereby, very fine and accurate parallax shifts which result in fine and accurate positioning in the depth direction.

As an example here, consider display and data of the same resolution; an existing display line segment consisting of 9 pixels (a) through (i); and a new data display segment consisting of 5 pixels (A) through (E). Table 1 shows how the new information is combined with the old information for five cases: case 1, with the new information obscuring pixels (c) through (g) of the old information but with no parallax offset (new information on the same plane as the old); cases 2 and 3, with additional left and right parallax shifts of one pixel; or, cases 4 and 5, with additional left and right shifts of 1/10th pixel. Thus, parallax offsets, and thereby depth plane spacing, of 1/10 (or any fraction) of that normally achievable by display hardware of a particular resolution may be implemented by such a software technique.

TABLE 1

| POSITION LETTER | CONTENTS CASE 1 | CONTENTS CASE 2 | CONTENTS CASE 3 | CONTENTS CASE 4 | CONTENTS CASE 5 |
|---|---|---|---|---|---|
| a | a | a | a | a | a |
| b | b | A | b | .1A + .9b | b |
| c | A | B | c | .9A + .1B | .9A + .1c |
| d | B | C | A | .9B + .1C | .1A + .9B |
| e | C | D | B | .9C + .1D | .1B + .9C |
| f | D | E | C | .9D + .1E | .1C + .9D |
| g | E | g | D | .9E + .1g | .1D + .9E |
| h | h | h | E | h | .1E + .9h |
| i | i | i | i | i | i |

However, two problems result from such sub-pixel positioning techniques. First, it is not clear what depth should be stored with a pixel whose display contents consists of a combination of two pixels at different depths. Second, it is complicated, if not impossible, to correctly 'un-do', erase, or further process pixels at the edges of such objects whose display contents consists of combinations of more than one object. This leads to the next embodiment of the instant invention.

Maintenance of Separate Objects

In order to avoid the above mentioned and similar problems, each separately painted plane, sub-plane, or other non-planer object, may be maintained as a separate object in separate buffers or sections of memory, other than the display's own memory. In this way, objects may then be properly parallax offset shifted, and left and right composite images built up in the portion of memory used by the display. With this scheme (as opposed to keeping only the composite image, only in display memory) objects may be moved in X, Y or Z without leaving 'holes' as objects reveal what is behind themselves. Additionally, when sub-pixel shifts, or other techniques such as 'anti-aliasing', result in display pixels that are composites of data pixels from more than one object, there is no problem due to not being unable to disentangle the composite information. Since the entire display image is reconstructed from the separate objects, the appropriate display pixel compositing is just re-computed from scratch.

An additional advantage is that objects may be made transparent or painted transparently; or, because objects have depth associated with them, a light source(s) may be specified and correctly calculated shadows may be cast in 3-D-space by some or all objects, to add realism to the final image. If either of these processes is done when just a composite image is stored, it is difficult, if not impossible, to undo transparency or shadow casting. Shadow casting would probably be implemented as a post-painting process. However, if the objects are stored separately, as described above, not only can they be moved and re-composited, but they can be re-composited with transparency and shadows.

Off-the-shelf high-speed image processing sub-systems such as the Intel DVI board for the IBM-PC are available. Such devices can achieve real-time or near-real-time compositing of many separate and separately offset image elements into a unified display image, or left and right pair of images.

Alternately, instead of software compositing the final image in display memory, it is also possible that each object may be kept in its own display buffer, with the composite image created only on the fly by properly offsetting and mixing the output signals from the multiple display buffer sections.

An additional advantage associated with this technique is that for many situations only a single copy of each object must be stored (with depth specification) and may be shifted in opposite directions prior to compositing for each of the left and right images. If alternate lines of an object/image are to be shifted in opposite directions for interleaved display, fine vertical detail may broken up into the two eye views, which may interfere with perception. Low-pass filtering in the vertical direction is one way to lessen such effects. Alternately, each source line may be used in each eye, although this will stretch the image vertically.

Combining Separate Objects for Display

In practice, most of the area of the left and right images composited from many objects will not be changing during the painting process; only those pixels under the brush or operational area will be effected. However, when an object is moved in any direction, much or all of the images will have to be recomposited. To organize such operation, the human operator may be presented with two portions of an interactive program: one geared to painting or creating objects; and, another geared toward rearranging objects and fine-tuning the compositing process.

Fine-tuning the compositing process may include various options as to how object boundaries are handled. Particularly when using sub-pixel parallax shifts, pixels at the boundaries of objects may contain data from more than one object, with more than one depth. Visibly, anti-aliasing or mixing of the visible data from multiple objects, in a pro rata fashion, may be used at the edges. Alternately; the visible information from the object that is closest, or the object that covers most of the pixel may be used for the entire pixel. An additional problem is to determine what depth value is to be used and stored (for offset or obscuring purposes) with such composite pixels. Again, the depth value of a dominant pixel may be used, or the depths from several component pixels may be used. If a depth value is to be derived from a composite, simple or weighted averaging of the several component depth values may be used.

Alternately, at these edges where the proper depth value is less certain, a technique may be adapted from applicants co-pending application Ser. No. 07/435,487, where color information was made less saturated or 'pure' as the edges of objects were approached. In this case the depth information will be made less 'pure' or 'fuzzier' by adding a random variation or noise to those pixels at or near the boundary of two objects separated in depth. In general, the closer to the edge, the less pure the depth will be. In practice, this will amount to picking depths for edge pixels that are randomly scattered between the near and far depths of: the component pixels, for anti-aliasing techniques or micro-positioning; or the bordering objects for other situations.

A PREFERRED EMBODIMENT

A '3-D Computer Paint System' has been programmed in the computer language 'C' by the applicant as a preferred embodiment of the instant invention. The program operates on the AT-VISTA display card installed in an IBM-PC/AT type computer.

The display is configured for 1008 (nominally 1024, and may be increased to a nominal 1536) horizontal by 486 vertical resolution, permitting a fine degree of horizontal parallax shifting (and, therefore, depth spacing) but configured for display on and recording by standard broadcast video equipment; as well as virtually all available electronic LCD-shuttered 3-D glasses.

As explained more fully above, the 'row table' feature of the AT-VISTA can be reconfigured for five display modes: left/right in odd/even video fields, for 60 Hz operation; right/left in odd/even video fields, for 60 Hz operation; left/right in over/under full frame, with a second blanking interval, for 120 Hz operation; right/left in over/under full frame, with a second blanking interval, for 120 Hz operation; left image on top, right image on bottom, for glasses-less viewing of both images separately (a debugging mode).

Facilities are provided for importing/exporting both 2-D and 3-D images, full screen or partial windows, at various resolutions (512, 640, 756/768, 1008/1024, 1512/1536) with proper aspect ratio conversion.

In order to simplify programming and operation, both the 'canvas' upon which the image is painted and the various brushes consist of continuous left and right parts; the interleaved display, when used, is only a function of the 'row table' feature. Each application of the brush, text or other function is thus carried out twice, once for each image, with the appropriate parallax offsets added to whatever normal 2-D positioning data is obtained from the mouse, data tablet or keyboard.

This paint system is supplied with an unusually large number of user adjustable parameters and options, and virtually all such options may be separately adjusted for the left and right canvases. Both field and frame cursor movement, as described above, are available.

At each pixel, eight bits each are stored for Red, Green and Blue visual information. The fourth eight-bit channel is used as follows. Seven bits are used for 'Z' or depth information. Of the 128 values thus possible, 101 are used: 50 into the screen; 50 out of the screen, into room space; and, the plane of the screen (no parallax offset). If the paint system is left with the plane of the screen selected, it may thus be used as a standard—but, very flexible—2-D paint system. The eighth bit of the fourth channel is reserved as a protection bit, whose use will be described below. The Red, Green, Blue, Depth and Protection data may each separately (and separately for each of the left and right canvases) be selected for writing to the frame buffers memory, or masked from writing to memory.

In this embodiment, where input comes from a 2-D data tablet, the user selects a single plane at a time upon which painting is to occur, or to which a flat or multi-depth function is to be referenced. Alternately, when connected to a 3-D input device, the selected plane may also be dynamically and continuously selected along with the X and Y position.

3-D Menu Elements

The 3-D paint system has many usual elements, menus of buttons, color and brush palettes, sub-menus, etc. but these are displayed and work in a uniquely 3-D way.

All buttons and palettes float upon a menu plane which, in turn, floats above the canvas; this effect is achieved by relative parallax offset. Similarly the text of the button floats above the plane of the. button. In addition, the buttons cast drop shadows in 3-D. Normally drop shadows are dark areas the same shape as the casting object offset down and right (or up, or left) and obscured by the casting object. In this case, in addition to the drop shadow offset, parallax offsets are added to the left and right shadows to make them appear behind the casting object. Similarly, elements cast shadows onto palettes, palettes cast shadows onto the menu plane, etc. Whenever selected or 'hit', buttons and other elements animate by depressing and returning as appropriate by altering the parallax shift of the selected element, through a number of positions, over several frame-times.

For certain functions windows open into the menu, and other user interface elements or messages are revealed. One such window is the 'ruler' a device with a set of tics for each plane that indicate the depth value of the selected plane (with progressively longer tics at intervals of 5, 10 and 50), whether that plane has been previously selected for painting, or whether that plane is currently set as 'protected' or masked from painting.

It should be noted that the Apple Macintosh computer, the IBM Windows operating system and other systems provide so-called Graphic User's Interfaces (GUIs) which incorporate menus, buttons and stacked windows on a 'desktop'. The desktop often gets crowded and confusing as many 2-D elements partially obscure each other. It is potentially useful to use the stereoscopic display techniques described herein to make such GUIs into 3-D user interfaces to assist users navigating through such crowded interfaces.

All options and features may be selected for the right channel, left channel, or both; and may be copied right-to-left and left-to-right. Different colors and brush halves are displayed for each eye as appropriate.

The cursor is positioned in Z as well as X and Y by the use of parallax offsets. In addition, flat rectangular cursors used to delineate areas for processing, storing, editing, etc. have been generalized to 'bricks' which delineate a rectangular solid space in the 3-D canvass.

Protection and Other Restrictions on Painting Pixels

Various methods are available to protect particular pixels from being effected by the painting process. Each of these various types may be selectively enabled or disabled for each of the two images.

As stated above, the eighth bit of the depth channel is reserved as a pixel-by-pixel protection bit. If this option at painting is selected during a painting function, the protection bit is turned on for each pixel changed. A complementary function prevents such protection tagged pixels from being painted over.

By selecting both the turning on of the protection bit by painting, and the use of the protection bit to prevent painting over, at the same time, a very useful function results. If one has selected a partial tinting paint function (e.g., tint all pixels hit by the brush 10% green) then repeatedly going over the same pixel will tint it more and more heavily. This may in fact be what is desired. But, if it is desired to uniformly tint an area to the same degree, each pixel should be effected only once; this is very hard to do free-hand. This technique guarantees that each pixel is effected no more than once. Using more bits for a 'protection plane' provide the ability to count the number of times a pixel has been painted or 'hit' and thus more functional flexibility. For example, such a protection counter could be used by the program to permit a pixel to be tinted heavily on its first hit, and progressively less heavily tinted on subsequent hits. Or to only perform a function after some threshold of hits has been reached.

By turning on the protection bit when painting, but masking the writing of Red, Green, Blue and Depth values, the operator may paint an area of 'protection from further painting' (Fixing) without effecting the contents on the screen or depth values. Areas may be similarly 'unfixed' by painting with the protection bit turned off and, again, masking Red, Green, Blue and Depth.

Similarly, if Red, Green and Blue are masked off, but Depth is not, an 'invisible sheet of glass' at a particular depth may be created which will protect everything behind it from being painted by a brush behind (further than) the plane of the 'glass' but which may be painted over by a brush closer than the plane of the glass.

Other types of protection are provided. Each plane may be explicitly protected by selecting it as such on the ruler. Facilities are provided to turn on or off specific values or ranges and complex combinations may be built up this way. Then pixels are painted, or not, based on their depth value rather than on the state of their own protection bit (although both methods may be used simultaneously). Pixels may also be protected because their display (Red, Green, Blue) contents are a specific value or in a specific range of color values.

Also, options are provided to restrict application of the painting function to: all depth values, one depth value, a range of depth values, all but one depth value, all but a range of depth values.

Lastly, when painting at a particular plane, it may be separately specified whether painting will or will not effect pixels that are: closer, further, or equal to the plane being painted. The usual mode is that pixels that are closer will not be affected.

These last two restrictions based on depth may be used in tandem. But, for some types of functions the first is applied prior to calculation (culling the points considered for the calculation of a digital filter, over a 3-D kernel, for example), and the second after calculation (culling which points are to be updated on the screen).

Brush List

In this paint system brushes may be any shape within a 16×16 pixel rectangle. However, like the canvas itself, each brush is 'disinterleaved into a right and left half, each only 8 pixels high by 16 pixels wide (128 pixels in all, for each half). The brush itself may have a single bit, or 8, 24 or 32 bits of information stored at each pixel. One may chose to use the two halves of the brush as a left/right pair or have either half repeated for both halves of the canvas. Each brush half may also be independently turned on or off for painting.

The paint system has many different painting modes, some of which require complex calculation at each pixel effected. Therefore, in order to keep the operation of the program running as fast as possible, unnecessary calculations must be avoided.

Part of painting is determining which pixels are excluded by the shape of the brush within its rectangle, by the various protection schemes, by the restriction of depth values, restriction of color values, or by the requirements of the particular painting mode (for example, luminance paint only paints if the pixel to be painted is brighter than the pixel contents already at that position). Two schemes are described below.

First, an essentially one-bit version of the brush may be kept, which operates as a mask or picture of which pixels are to be effected. At the beginning of each application of the brush, the various protection schemes are checked and bits in the mask are turned off if protection will eliminate that pixel from being effected. Only those pixels still represented in the reduced brush mask are then applied to the canvas. The problem with this scheme is that the various protection schemes and many elements of the paint amount to a decision being carried out (is the protection bit on, is the depth value separately protected, etc.). While finding that a bit is turned off in the one-bit image of the brush eliminates the need to proceed further with a particular test, the test of whether each of the 128 pixels (for each brush half) are on or off in the brush image must be repeatedly tested for each pass of protection or final painting as the brush is laid down once. One may test 128 pixels for each of M tests or one may perform M test for each of 128 pixels, the result is still 128 times M tests.

To get around this problem the instant systems instead keeps each brush as a list of pixels. Each list of bytes starts with a counter that tells how many entries are in the list: between 0 (no pixels in the brush) and 128 (all pixels on). Then the list follows with that many entries listing the location (in raster order) of each pixel in the brush. In raster order, from left to right, top to bottom, the upper left corner is 0, the lower right corner 127. Since a rectangle of image is brought into or taken from the computer's memory by the AT-VISTA display as a linear array in raster order, this scheme works well.

Thus, if the brush contains very few pixels, the list is short and very few pixels must be considered. No time is wasted repeatedly considering and then rejecting as not valid the many 'off' pixels in a brush image. As each protection scheme is applied, rejected pixels are removed from the list since, once rejected for one reason, it is no longer necessary to determine if a pixel is to be rejected for a second reason as well.

The list is shortened by taking the last entry, placing it in the rejected pixels position, and decrementing the first list entry (the counter) by one. In this way, whether a pixel is 'on' or 'off' never needs to be considered; off pixels are never on the list for consideration to begin with. The list can only get shorter as pixels are rejected by various tests.

Painting Modes

The 3-D paint system has many different paint modes; some are similar to 2-D paint systems; others are unique to this program. Standard painting may be achieved by using a one-bit 'rubber stamp-like' brush with a color chosen from the palette. Alternately a brush may be a 'picture' with Red, Green and Blue (and even Transparency or Depth) values stored at each pixel. This bush may than be applied to the canvas in a straightforward manner, or my be used to tint (change hue but not luminance) or shade (change luminance but not hue) the canvas. The entire result may also be modulated by a transparency factor which keeps some proportion of the old pixel's display value.

In addition to the other protection schemes described above, several versions of 'luminance' paint are available which limit painting to pixels whose new value will be above (or below) a threshold based on an average of the Red, Green and Blue values; a television luminance calculation; or separate comparisons for each of the Red, Green and Blue plane values.

Other types of painting perform various mathematical calculations (e.g., logical AND, OR, XOR, and their complements, addition, subtraction, multiplication (with and without clipping), etc.) on the current and brush pixels data and use the results to replace the old pixel (again in regular, tint, shade or transparent fashion).

Still other types of painting perform a calculation based only on the canvas pixels' values, based on some parameters. For example, several image processing functions can be attached to the tip of the brush to selectively adjust level, gain, contrast, saturation,.color correction, etc. on a freehand basis.

Other types look to a neighborhood around the affected pixel and perform various digital filters that may blur, soften, sharpen, etc. the image; or, may smear pixel values in the direction of the motion of the brush.

'Air' brushing is a technique that lays down a transparent, soft-edged swipe of color in two dimensions on the canvas. There is also 'Spray' painting that does so but with a thick curved tube (by use of depth values and parallax offset of individual pixels) several planes thick; it has a dense center with a 'haze' around it. A similar tube-like mode with a 'hot' center and softer 'glow' is dubbed 'neon' paint. In these 'thick' painting modes the depth values may be updated, creating a substantial object. Alternately, depth values may be left unchanged so that no record of the spray's existence would be made, it would be 'insubstantial'. Additionally, the core may be made substantial with the 'glow' or 'haze' made insubstantial.

In addition to arbitrary 16 by 16 pixel brushes. Larger computational brushes are available. A 'disk' is round with uniform density and a sharp but anti-aliased edge; a 'cone' is round with a dense center which falls off to transparent in a controlled fashion; a 'ball' is like a cone but, again, with depth values that give it thickness and roundness in the Z direction. Storing transparency values for individual brush pixels is used to implement the soft edges or glows described above.

One last painting mode will be described; Shape paint painting is done on the surface of a 3-D shape already in the frame buffer, changing the surface look but not the depth shape. A color and brush are picked as usual. However, instead of picking a depth and painting at a particular parallax offset, when Shape paint mode is picked, pairs of pixels with the appropriate cursor Y value are compared. When two pixels (in the two images) are found whose stored depth values are the same and their relative parallax offset consistent with that depth value as applied to the non-parallax-adjusted X value of the cursor, that pixel pair has the right X, Y and 'virtual' Z to be painted.

'Solid' objects may be built up from contours at different depth planes (like a contour map) or may be rendered by other software and imported, or rendered by the 3-D paint system. In addition, libraries of precomputed shapes may be made available to the operator, much like 2-D clip-art. In any of those cases, shape paint will permit the surface of those objects to be re-painted without disturbing their shape.

The ability to create 3-D objects by stacking painted contours, as well as to import and combine 3-D objects from other sources, and to 'Shape paint' provide a flexible mechanism for a painter or illustrator to create 3-D objects and environments. One particularly useful application for this system will be the creation of such objects and environments for inclusion in Virtual Reality simulation systems. These 'illustrations with depth' can be converted by software utilities to the appropriate file formats for such VR rendering systems.

Lines and Other Primitives

Although the depth planes are noticeably separated, lines and other primitives (rectangles, polygons, etc.) may be drawn to smoothly span the distance between planes. A 3-D line or polygon may be drawn by adding appropriate parallax offsets to the end-points or vertices of the object (different for the left and right image) and using existing or well known algorithms for drawing the adjusted image twice: once for the left, once for the right.

A problem results in that while the image may appear to be smoothly spanning a 3-D space, the depth values stored for those visible pixels will be quantized or 'stairstepped'. This situation may be kept in mind as a limitation of the system or, alternately, the depth values may be 'dithered'. Dithering randomly selects one value from the closest available quantized depth values above X and below the desired depth value. The probability of selecting one or the other is adjusted depending upon how close each available value is to the desired value.

In this way a 'fuzzy' rather than stairstepped depth image is created and when further painting or other image functions interact with the object, a fuzzy but smooth looking intersection with the new object results.

If 16-bits are available for depth buffering, the entire issue becomes moot because enough resolution in the depth direction is available for smooth depth specification without dithering.

Additional Features, Techniques and Embodiments

Serial Parallax

It must be understood that the parallax shifts associated with the left and right eye views, in effect, change the point of view (POV) of the viewer of the multi-plane image. By adding coordinated, rather than opposite, shifts, the POV of the two-eyed viewer may be shifted. Several useful variations result.

First, even without glasses or any kind of binocular stereoscopy, the POV may be shifted in 'wiggling' motion to produce 'motion (serial) parallax' which can convey much depth information. Although the perceived wiggling of the image can be annoying, and therefore is of limited user for long entertainment presentations. For short term 'bringing to life' of stacked multi-plane images, such as those created by the instant system, this method can be very useful to convey 3-D information without any glasses. For, scientific, industrial, military, educational or medical imaging, 3-D visualization of data can be achieved without glasses.

The applicant has found that five such images—with no parallax offset (N), slight offsets to the right and left (r and l), and greater offsets to the right and left (R and L)—a strong 3-D effect can be achieved by alternating them in the following order: L, l, N, r, R, r, N, l, L, l, N, r, R, r, N, l, etc.

As explained briefly above, the applicant has used the Intel DVI board to composite images in real- or near-real-time utilizing the multi-plane techniques described herein. Such a system can be programmed to update the POV, or parallax shifts between planes, to implement the above. Additionally, when coupled to input from a head-position-tracking device, the POV can be updated continuously to create a display from the appropriate perspective as the viewer moves around the room; this is a very powerful 3-D (though not binocular) effect. The combination of 3-D glasses and the head-tracker (or a head-mounted display) produce an even more powerful effect. In that case, not only head position but orientation may be captured and each eye may be displayed with proper horizontal and vertical parallax offsets, since head orientation may tilt the eyes.

Such a system is a low-end alternative to costly full-immersion helmet-based Virtual Reality displays. When using such a system and drastically changing the viewer's POV (particularly when the multi-plane image is derived from a 2-D image or film/video sequence as described in applicant's U.S. Pat. No. 4,925,294) holes in the image may develop, and the reverse sides of objects may need to be displayed. It is just such as system as described herein that will be used to fill those holes or 'paint' the reverse sides of objects so that not only will 2-D images and motion sequences be able to be adapted to 3-D stereoscopic displays, but may also be adapted for use with Virtual Reality systems.

Stereo Broadcasting

Systems have been disclosed, such as that by NYIT, where two images may be combined in such a way that by proper frequency filtering either one may be displayed. This has been disclosed as intended to be utilized to transmit two entirely independent image streams. However, it is also possible to transmit the left image as one image stream and the right image as the other stream. Alternately, the single center image stream may be sent and a second, perhaps lower-quality, image stream (by the above or any other method of hidden information) may contain depth information only. Then, as described above, the depth image may be used to distort the single image, once to the left, once to the right, to create stereoscopic paired image streams.

When distorting such a single image into left and right images, (or as described elsewhere in the instant application) holes may develop as shown below with B to the rear of A and C.

television signal and by the use of a frame store, show each twice. Such a framestore device may be easily modified to solve the flicker problem associated with 3-D electronic LCD-shuttered glasses which deliver only 30 fields to each eye. Similarly, because the odd lines go the one eye, and the even lines to the other, vertical resolution to each eye is halved. A television with a frame store device would be able to fill in those gaps during display. Application of the applicant's variable Spatial-Temporal Signature (STS) to this technique will prove useful. See applicant's Ser. No. 07/077,916.

Additionally, a new type of low-cost electronic stereo glasses may be used where small lights (or LEDs) are flickered, alternating with each eye in synchrony to the alternating left/right pattern. The light for one eye is on while the image for the other eye is displayed. Although not bright enough to completely disturb vision, the small flash in one eye will suppress the perception of the unwanted image in that eye. The light may be directly flashed into the visual field or, preferably, through a diffusion element. Alternately, half-reflective lenses may be used in these glasses which will reflect the internal light flash but otherwise pass the television image to the eye. There will also have to be an opaque barrier to prevent cross-talk between the two lights and two eyes.

Interleaving Other than by Field or Frame

Generally, left and right image pairs are alternated as video fields or frames. However, interleaving of smaller image sections can be used to advantage for improved perception. Individual lines or sub-lines can be alternated from the left and right images. Faster flickering electronic LCD-glasses, than currently available on a low-cost basis, would be required to decode such an image. However, if using passive red/green anaglyphic glasses, flickering is not an issue.

The problem with using red/green anaglyphic images with television is that the color encoding process lowers the resolution of the color portion of the signal. However, if whole individual lines (or large line parts) of the image were uniformly tinted red (for left) or green (for right) these large sections would be displayed at high resolution because only their luminance portion would be changing, not the color portion of the signal. Thus, high-resolution anaglyphic images could be broadcast or taken from videotape.

For either of the techniques described above, the way that the left/right information is distributed over the frame may be changed from frame to frame in a non-trivial manner, as a way to improve perception. This technique, called a variable STS, is described in some detail in applicant's co-pending application Ser. No. 07/077,916.

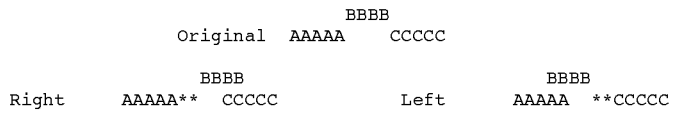

Such holes (\*\*) may be automatically covered by stretching the available material at either end, or by interpolating the material on either side of the holes. In one approach the holes may be filled with values derived from interpolating from A to C. Alternately, the hole in the right image may be covered with material interpolated between A and B; and, the hole in the left image may be covered with material interpolated between B and C.

Also, frame-rate-doubling televisions are now commercially available. These take the 60 fields of a standard 3-D Mouse As described above, the 3-D paint system will operate at a continuously and dynamically selected depth with the addition of a 3-D input device. Such a device is described in the following pages.

For inputting positional information to digital computers, mice (basically upside-down trackballs) operate with a single roller-ball or optical sensor and give two axis inputs: X (left-to-right) and Y (away/toward the user). One, two or more buttons allow for selection type input as well. Flat X-Y data tablets provide similar functionality, with one on/off 'button' function often tied to the pen tip.

For many 'flat screen oriented' applications this is adequate. However, for other applications additional input axes are advantageous. Tablet and pen units exist where tip pressure (rather than just on/off contact) is measured and can be used for a third axis. However, such a solution is costly, delicate and takes up a large amount of desk space. Further, for many, especially for 'non-computer-artists' who are the vast majority of users, a mouse type device is preferable to a tablet and pen.

The present discussion relates to a class a mouse-like input devices that employ multiple roller-balls (or optical sensors) to provide additional input axes and a versatile user interface.

If a second ball is added to the underside of a mouse, input on a third axis is possible—a twist about the Z axis; i.e., the axis perpendicular to the two axes of normal mouse movement. Such input could be used as a rotational parameter, for example, to point a screen cursor in a particular direction, not just position the cursor on the X-Y plane; or, for other rotational information, such as to rotate 3-D objects in a computer graphic or CAD system. Alternately, the input may be used as s magnitude parameter, for example to translate along the Z-axis, e.g., clockwise (CW) twist for up (with respect to the desktop, or out with respect to the screen) and counterclockwise (CCW) twist for down (or in). Or, it may be used for sign or selection information for a 'double button' like a two way switch or knob, e.g., CW twist for 'plus' or select, CCW twist for 'minus' or cancel.

The two-ball mouse comprises two trackballs mounted fore and aft to (of) the center point of the Y-axis. (Alternately, the two balls could be mounted to the left and right of the center of the X axis; but, this wide mouse would probably be harder to hold.) For normal X (side-to-side) and Y (up/down) operation, the two balls operate in tandem, giving (theoretically, and at least approximately) equal output. For a twist, CW as seen from above, the rear ball will register a positive or rightward X output, the rear ball a negative or leftward X output. A CCW twist will produce complementary output.

The output of both balls can be sent on to the host computer for integration there, or they may be integrated by the circuit in the two-ball mouse for transmission of X, Y and Z data (along with the button hit information as well).

The two-ball mouse's software driver will pass on the X, Y, Z and button-state information to applications programmed to properly interpret it. Alternately, in a standard mouse compatibility mode, only the standard X, Y and button information would be presented to the application.

In mouse-like manner, the two-ball mouse may be lifted, unwound and replaced on the pad for continued twisting. However, an alternate interpretation of the input by the software, either in the mouse or in the host computer device driver, would allow for a 'wind-up mode'. Like a mechanical watch stem, the CW (or CCW, perhaps chosen by whichever move started the sequence) twists would accumulate, the CCW would be ignored. Alternately, the CW and CCW twists could be summed for a magnitude, the sign being specified, e.g., by a 'button' or by which twist direction started the sequence. Which twist mode is in operation may be specified by the user via a button or a menu selection, or may be determined by the application depending on which software function were in operation. In particular, software may allow the user to turn off wind-up mode by making a normal X or Y axis motion; pausing longer than some threshold between twists; making repeated turns in the same direction, or further than the normal back-and-forth wind-up twists; or by some other programmed gesture.

The advantage of such a wind-up mode is that it allows the mouse (and more importantly the user's wrist) to twist back and forth, without lifting the mouse for the unwanted directional twists, and to accumulate a total rotation much further than the range of the human wrist would allow.

A similar mode could also be implemented to avoid having to go through the 'drag-lift-drag-lift-drag' sequence for long X and Y motions. However, due to ergonomics, this feature is much more important for the much more restricted rotational movements.

In the twist mode described above, the axis of twist is through a point between the two balls, and the front and rear balls act in opposition. In an alternate 'pin and wag' mode, the axis of twist would pass through the center of either the front or rear trackball. In such a mode the pinned ball would see (theoretically, or at least approximately) no movement and the other ball would 'wag' left and right, along the X axis with a slight curve, for balls mounted front and rear. So, in addition to twist CW/CCW, one could pin the head ball and 'wag the tail' back and fourth, or pin the tail and wag the head back and fourth.

As a way to implement a variation on the 'pin and wag' mode, a 'rocker' pin or ball would be placed between the two trackballs. This pivot would extend somewhat beyond the two trackballs and would allow the user to pivot to have either the front or rear ball contact the mouse pad, without the other making contact. In that way, the contacted ball could be 'wagged' around the pivot, in a manner similar to above but with a smaller pivot radius. But, for even more flexibility the pivot point would have a small roller-ball in its tip, much like a large-bore, inkless, ballpoint pen refill. As such, the rear (or front) ball and pivot could be moved left and right along the X axis, much like the wagging mode; or, back and fourth along the Y axis.

A spring load in the pivot point would allow the user to apply a small amount of additional pressure to have both the front and rear balls contact the mouse pad at the same time. In that case, the dual-ball X and Y motions, as well as the twist mode, would be available.

Thus, there would be a total of at least seven axes with the dual trackball mouse, as opposed to only two (X and Y) with a standard mouse. These are: X and Y pivoted for the front only, X and Y pivoted for rear only, X and Y with both balls contacting and moving in a coordinated way and, lastly, twisting with both balls contacting in an anti-coordinated way.

In addition to increasing the number of input axes from 2 to 7, a dual trackball mouse would permit the new gestures to be added to the X-Y positioning and button clicking of the standard mouse. As on example, a 'wrist flick' could be used to implement a number of useful functions such as a 'page flip' to browse through a text file as if it were a book.

A flick consisting of a short CW motion followed by a return CCW motion would constitute a jump ahead one page command; a CCW-CW combination, a turn back one page. A(n adjustable) threshold of, say, about 5 degrees would prevent accidental page turning from minor jiggling of the mouse. A larger flip would turn 2, 5 or 10 pages (again, perhaps user selectable) and a very large flip would turn 50 or 100 pages. The degree of 'largeness' would be increased by: increasing the CW/CCW rotation to 10, 15 or more degrees; increasing the speed of the flip; increasing the time between the CW and CCW phases of the flip, or between two successive flips; or, to make a number of flips in quick succession with 1, 2 or 3 flips indicating 1, 10 or 100 pages, for example.

Many other gestures and axis combinations can be developed with such a device and the proper software. For example, in a computer painting or drawing program, calligraphic writing may be implemented by drawing in X and Y as usual and, in addition, controlling the angle or tilt of the 'pen' by twisting the mouse. Similarly, for 3-D modeling or sculpting, an oriented chisel-like function may be implemented.

Or, using the two trackballs independently, with the rocker, two separate objects may be controlled simultaneously without having to switch back and forth between functions, using a button click. By pressing harder, and having both balls contact the mouse pad, the two objects may also be moved together in a coordinated manner.

More than two roller-balls may be used for additional input axes and increased system flexibility. Many configurations are possible and within the scope of the present invention but, in particular, four- and five-ball configurations will be discussed blow.

Consider a situation where four balls are placed at the four compass points (East, equal 0 degrees, is to the direct right). All balls would act in unison and would thus provide only X, Y and twist axes; no improvement over two roller-balls. However, if an extended, rolling pivot were provided in between the four roller-balls, each of the four balls could be made to contact the mouse pad independently, by tilting the whole mouse to the right, left, away or toward the user. Each of the four balls would provide input along the X and Y axes, for a total of eight axes.

However, now consider the situation where the central pivot ball were also an active input roller-ball. When used with each of the four corner balls, the central ball would provide a pair of balls and this be able to provide a twist axis as well as X and Y, for a total of 12 axes. Additionally (perhaps, depending upon the amount that the central ball is extended and the dexterity of the user) by balancing carefully, so that none of the corner balls touched the pad, the central ball alone could provide an additional set of X and Y axes, for a total of 14.

Such an embodiment may be particularly useful for systems used to design and produce 3-D computer animation. In such systems it is often required to specify (at least for key frames) the X, Y and Z positions as well as rotations around the X, Y and Z axes, for both objects and the theoretical 'camera'. These four groups of 3 parameters may each be assigned to the four corner roller-balls, each with 3 axes. Thus, without having to switch between modes, all of the required positioning information may be controlled gesturally. The same corner roller-balls may be used to enter other information in other modes; mode-switching would be achieved with the active center ball, or otherwise.

It should be noted that for optical mice, (where an optical sensor counts a number of lines passed over on the mouse pad, instead of a roller ball physically rolling over the pad) a small contact switch would be mounted for each sensor to sense which of the four 'balls' were being tilted toward for selection. Or, some other set of orientation sensing devices, for example, mercury switches, would be used.

An additional variation provides extra stability to the embodiment described above. Consider the situation where the East or right roller-ball is chosen, by pivoting the entire assembly, on the central ball, to the right. In that orientation, the device is not entirely stable; it may, additionally, be tilted North or South, or balanced in between. When tilted North and East both balls touch the pad (as well as the central ball) and a stable configuration is achieved; similarly, for South and East.

Thus, if (instead of North, South, East and West) the NE, NW, SE, and SW directions were used, four stable configurations would be achieved. Although each of the four corner balls would be used twice, each of the pairs is unique and, therefore, no confusion would exist. An added benefit of this embodiment is that, since two corner balls are used in each mode, X, Y, and twist axes are accessible for each of the NE, NW, SE and SW corners, for a total of twelve axes without having an active center roller-ball; 14 axes with an active center.

In practice, the entire design may be rotated 45 degrees, so that the active corner roller-balls would be located at the NE, NW, SE and SW corners, with stable tilt configurations at N, S, E and W.

Of course, with a dexterous user, all eight directions (N, NE, E, SE, S, SW, W, NW) may be used for a total of 20 axes without an active central ball; 26 with.

In addition to the specific configurations, uses and gestures described above, with additional input axes available, the possibilities for games, 3-D animation, computer aided design, machine or robot control, or other user interfaces are greatly increased.

Finally, all of the principles and techniques described above can also be applied to multiple transducers on other computer input devices. For example, two (or more) pen/stylus or puck/cursor receptors may be put in the same housing and queried (in parallel or serially) to generate not only position information but orientation information as well; or, two trackballs may be mounted in such a way as to be covered by the palm and thus input direction information, not just X and Y positional information.

It will thus be seen that the objects set forth above, among those made apparent from the preceding description, are efficiently attained and certain changes may be made in carrying out the above method and in the construction set forth. For example, the substitution or combination of various technologies, including but not limited to: analog and digital circuitry; special purpose circuitry and general purpose circuitry running software; various 3D displays, such as those employing passive or active glasses, lenticular screens, CRT displays, holographic film, virtual reality and serial motion parallax; trackballs, mice, styluses and data tablets, or other position or input sensors in coordinated use as described herein; and, various ways of storing image and depth information. Accordingly, it is intended that all matter contained in the above description or shown in the accompanying figures shall be interpreted as illustrative and not in a limiting sense.

Now that the invention has been described, what is claimed as new and desired to be secured by Letters Patent is:

1. An improved method for creating image information by using a computer paint system, wherein painting functions include at least some function available in standard computer paint systems including brush-oriented painting and pen-oriented drawing functions, wherein said improvement comprises the creation of three-dimensional image information, wherein said three-dimensional creation is effected by maintenance of a plurality of image information memories and application of at least one paint function to at least two of said image information memories and wherein the application of said at least one paint function in a first of said image information memories is offset with respect to the application of the same paint function in a second of said image information memories.

2. A method for integrating 2D and 3D image elements by utilizing the method of claim 1.

3. A method for modifying a 3D image by utilizing the method of claim 1.

4. A method as in claim 1 wherein said offset may be adjusted by a fraction of a pixel for at least one image information value by application of interpolation to apportion said image information value to more than one image information memory location.

5. A method as in claim 1 wherein a painting function is truncated in such a manner that for progressively larger offsets an extreme edge of the area to which said painting function may be applied is progressively restricted in order to avoid the application of said painting function to an image intended to be displayed to one eye without it also being applied to an image intended to be displayed to the other eye.

6. A method as in claim 1 wherein said plurality of image information memories are each uniquely associated with at least one of a plurality of image information elements, and left and right images are created by applying parallax offsets to at least some of said plurality of image information elements, and wherein said parallax offsets are determined as a function of depth information associated with at least some of said image information elements.

7. A method as in claim 6 wherein said offsets may be adjusted by a fraction of a pixel for at least one image information memory value by application of interpolation to apportion said image information value to more than one image information display pixel.

8. A method as in claim 1 wherein said plurality of image information memories comprises two, a left image information memory and a right image information memory, and said offset is binocular parallax offset.

9. A method as in claim 8 wherein said left and right image information memories are each maintained as separate contiguous areas of memory and combination of the contents of said left and right image memories is effected only upon display.

10. A method as in claim 8 wherein said left and right image information memories are arranged in an interleaved fashion within a single information memory.

11. A method as in claim 8 wherein an image, element is loaded into both left and right image information memories without offset, the contents of said image information memories are then parallax shifted with respect to each other, and subsequently an additional image element is loaded into both left and right image information memories without offset.

12. A method for displaying information with the perception of depth comprising the synthesis of a plurality of images each created by the process of claim 1, each of said images constructed from a different viewing position, and displaying said plurality of images in an oscillatory sequential manner.

13. A method as in claim 12 comprising in addition the step of conveying at least some of said image information embodied as a video signal via an information bearing medium.

14. A method as in claim 1 comprising, in addition, an improved method for operator input of scaler information to a computer system, wherein the improvement comprises interpretation of the input from a plurality of transducers which are used in two distinct modes one of which is in a coordinated fashion to specify values for a first set of variables and a second of which is in an anti-coordinated fashion to specify values for a second set of variables.

15. A method as in claim 1 comprising in addition the step of conveying at least some of said information via a digital information bearing medium.

16. A method as in claim 1, wherein said plurality of image information memories is two.

17. A method as in claim 1, wherein said plurality of image information memories is more than two.

18. A method as in claim 1 comprising in addition the step of conveying at least some of said image information embodied as a video signal via an information bearing medium.

19. A method as in claim 1 comprising in addition the step of conveying said image information via a left and right pair of film images.

20. An improved method for creating final image information by using a computer image creation/modification system, wherein image creation/modification functions include at least one function available in standard computer paint systems including brush-oriented painting functions, wherein said improvement comprises storage of image depth information in addition to image color information, and wherein said image depth information specifies other than a single plane perpendicular to the depth axis when depth excursions representing surface texture are eliminated, and wherein said at least one function produces dynamic visible feedback in the display of said final image information of its effect upon at least some of said image information during its operation.

21. A method as in claim 20 wherein obscuring of one image information element by another is based on said image depth information.

22. A method as in claim 20 wherein an additional improvement comprises at least one function to paint with a brush that applies both color value to a color image memory plane and depth value to a depth image memory plane.

23. A method as in claim 20 wherein said depth information is sub-divided into depth tag and depth value information and a depth specification to be used is derived as a function of the depth tag and depth value.

24. A method as in claim 20 wherein an additional improvement comprises that for at least one image processing function a set of pixels input to said image processing function and a set of pixels effected by output of said image processing function are dependent upon depth information associated with at least some of said input and effected pixels.

25. A method as in claim 24 comprising in addition the step of conveying at least some of said image information embodied as a video signal carried by an information bearing medium.

26. A method as in claim 20 wherein an additional improvement comprises inclusion in said created image information of shadows cast by at least one first element onto at least one second element whereby a shadow casting function is calculated based upon said depth information.

27. A method as in claim 20 comprising, in addition, an improved method for applying paint system brush-oriented functions, whereby for active/existing pixels within a brush shape, which brush shape is often, but not necessarily, a bounding rectangle, the value of the image under each brush pixel is replaced by some function of the brush pixel value, or its neighborhood, and the value of the image under the brush pixel, or its neighborhood; and whereby prior to affecting said replacement, for each active/existing pixel within the brush shape, various conditions must be tested for and met; which conditions include in any combination criteria of values for color, protection, depth, obscuration, alpha, transparency and any other image plane present in a specific computer paint system into which said improvement has been incorporated, for the brush pixel value, image pixel value or some combination of the two; which results in a necessity to perform as many as P×C tests where P is defined as the number of pixels within said brush shape, and C is defined as the number of conditions to be met for any pixel within said brush shape to maintain active/existing status; wherein the improvement comprises: maintenance of said brush as an array of pixel values and maintenance of a list of brush pixel address indices; and whereby non-active/non-existent pixels which are within the bounding shape do not appear on the list; and further manipulation of said list whereby when a pixel fails any one test which is critical said pixel is removed from said list and eliminated from consideration for subsequent tests of conditions to be met.

28. A method as in claim 20 comprising, in addition, an improved method for applying paint system brush-oriented functions, wherein the improvement comprises that during execution of at least some paint function an image protection plane, of at least one bit, is maintained such that said image protection plane may be both written into and referenced during painting and whereby the action of the paint function on the image is adjusted based upon values already stored in said image protection plane.

29. A method as in claim 20 comprising, in addition, an improved method for applying paint system brush-oriented functions, wherein the improvement comprises application of image processing functions, which in standard practice are applied by a program to an entire image or within a bounding shape, including contrast correction, color correction, gamma correction, gain, offset, and math and logical functions, to pixels under a brush being used by an operator.

30. A method for compatible stereoscopic broadcast comprising: the broadcast of a two-dimensional image which may be displayed on a standard-type television display; additionally, the broadcast of depth information which is not visibly displayed on a standard television; the distortion of said two-dimensional image into two images, at least one of which has been modified by the method of claim 20 with respect to said two-dimensional image based upon said depth information; and, the stereoscopic display of said two images.

31. A method as in claim 30 wherein said depth information is encoded into a video blanking interval prior to the two-dimensional image which is to be modified based upon said depth information.

32. A improved method for stereoscopic display of information created by the process of claim 20, wherein the improvement comprises display of said stereoscopic display as an anaglyphic display comprising a first image tinted by a first color and a second image tinted by a second color, and interleaving of segments tinted by said first color only with segments tinted by said second color only.

33. A method as in claim 32 wherein distribution of those segments tinted by a first color only and those segments tinted by a second color only is varied on a frame-to-frame basis by a variable Spatial-Temporal Signature scheme.

34. A method as in claim 32 comprising in addition the step of conveying at least some of said image information embodied as a video signal via an information bearing medium.

35. A method as in claim 32 wherein said segments each comprise one video line.

36. A method as in claim 20 wherein said depth information is referenced to determine if a selected painting function is to be applied to a selected area of image information.

37. A method as in claim 20 comprising in addition the step of conveying at least some of said information via a digital information bearing medium.

38. A method as in claim 30 comprising in addition the step of conveying at least some of said image information embodied as a video signal via an information bearing medium.

39. A method for the creation of a stereoscopic display comprising the interleaving of at least two images at least one of which was created by the method of claim 20, wherein at least some of the interleaved segments are less than one video field.

40. A product produced by the method of claim 39 and embodied as a video signal carried by an information bearing medium.

41. An improved method as in claim 20 for displaying diagnostic and other medical images which can include x-ray, CAT, NMR, endoscopic, photographic, video, computer or film images, wherein the improvement comprises the creation or modification of depth information to be incorporated into said medical images.

42. A method for viewing sequentially interleaved binocular information created by the method of claim 20 comprising in addition to said method the viewing of said information by use of a set of glasses incorporating light sources which are directed to each eye separately wherein the light sources for the left and right eye are alternated in such a manner that the light source is illuminated for the eye opposite to that for which an image being displayed is intended.

43. An improved method for creating three-dimensional images by the method of claim 20 wherein the improvement comprises that: for areas of ambiguous or uncertain depth, such as boundaries between objects separated in the depth direction, the depth value utilized is modulated by a random-noise-like function.

44. A method as in claim 20 wherein said image final information is three-dimensional.

45. A method as in claim 20 wherein said image final information is stereoscopic.

46. A method as in claim 20 wherein the display of said final image information is effected by said stored image depth information.

47. A method as in claim 20 comprising in addition the creation or modification of depth information to be incorporated into said final image information.

48. A method as in claim 20 wherein at least some of said image depth information is non-planar.

49. A method as in claim 48 wherein, in addition, each pixel of standard image information has associated with it a unique pixel of image depth information, and wherein said at least one function effects said image depth information during its operation.

50. A computer program stored on a computer readable medium comprising:
  a. instructions for performing image creation/modification functions which include at least one function available in standard computer paint systems including brush-oriented painting functions; and,
  b. instructions for storing image depth information in addition to image color information wherein said image depth information specifies other than a single plane perpendicular to the depth axis when depth excursions representing surface texture are eliminated.

51. A computer program as in claim 50 for creating virtual reality databases comprising in addition:
  c. instructions for deriving virtual reality shape information from said image depth information.

52. A computer program as in claim 51 additionally comprising instructions to provide that:

a. virtual reality texture information is derived from the color information of said three-dimensional image;
b. said program can operate repeatedly on a series of separate still images each of which is derived from a motion picture sequence; and,
c. additional depth, position or shape information is automatically derived by computer analysis of the changes in geometry of elements contained in a multiplicity of said still images.

53. A computer program as in claim 51 additionally comprising:
d. instructions for deriving virtual reality texture information from said image color information.

54. A computer program as in claim 51, wherein said virtual reality is a videogame.

55. A computer program as in claim 50 additionally comprising instructions to provide for the display of diagnostic and other medical images which can include x-ray, CAT, NMR, endoscopic, photographic, video, computer or film images, wherein the improvement comprises the creation or modification of depth information to be incorporated into said medical images.

56. An improved method for creating image information by using a computer image creation/modification system, wherein image creation/modification functions include at least one function available in standard computer paint systems including brush-oriented painting functions, wherein said improvement comprises storage of depth information in addition to standard image information and wherein an additional improvement comprises the ability to separately inhibit writing to at least one of a multiplicity of information planes which can include red, green, blue, color index, depth, obscuration, protection, alpha, transparency and any other image plane present in a specific computer paint system into which said additional improvement has been incorporated.

57. A method as in claim 56 wherein an additional improvement comprises at least one function, such as 'painting a sheet of glass', that updates depth information plane values without updating color information plane values.

58. A method as in claim 56 wherein an additional improvement comprises at least one function, such as shape paint, that updates color information plane values without updating depth information plane values.

59. An improved method for creating final image information by using a computer image creation/modification system, wherein image creation/modification functions include at least one function available in standard computer paint systems including brush-oriented painting functions, wherein said improvement comprises storage of image depth information in addition to image color information, and wherein said at least one function effects said image depth information during its operation, and wherein said at least one function produces dynamic visible feedback in the display of said final image information of its effect upon at least some of said image information during its operation.

60. A method as in claim 59 for creating virtual reality databases whereby virtual reality shape information is derived from said image depth information.

61. A method as in claim 60 comprising in addition the step of conveying at least some of said information embodied as a virtual reality database via a digital information bearing medium.

62. A computer program as in claim 61, wherein said virtual reality is a videogame.

63. A method as in claim 60 whereby, in addition, virtual reality texture information is derived from said image color information.

64. A method as in claim 63 for creating virtual reality databases whereby said method is repeatedly applied to a series of separate still images each of which is derived from a motion picture sequence.

65. A method as in claim 64 wherein additional depth, position or shape information is automatically derived by computer analysis of the changes in geometry of elements contained in a multiplicity of said still images.

66. A product produced by the method of claim 64 comprising a virtual reality database and mediated by a digital information bearing medium.

67. A computer program as in claim 66, wherein said virtual reality is a videogame.

68. A computer program as in claim 64, wherein said virtual reality is a videogame.

69. A method as in claim 59 wherein said image final information is three-dimensional.

70. A method as in claim 59 wherein said image final information is stereoscopic.

71. A method as in claim 59 wherein the display of said final image information is effected by said stored image depth information.

72. A method as in claim 59 comprising in addition the creation or modification of depth information to be incorporated into said final image information.

73. A method as in claim 59 comprising in addition the step of conveying at least some of said information via an information bearing medium.

74. A method as in claim 59 wherein said image depth information specifies other than a single plane perpendicular to the depth axis when depth excursions representing surface texture are eliminated.

75. A method for modifying a pre-existing stereoscopic image by:
a. creating from the information comprising said pre-existing stereoscopic image an image set of at least two images where stereoscopic depth is expressed as parallax offsets between coherent features as represented in individual images of said image set; and,
b. altering parallax shifts of said coherent image features within said image set.

76. An improved method for creating image information by using a computer paint system, wherein painting functions include at least some function available in standard computer paint systems including brush-oriented painting and pen-oriented drawing functions, wherein said improvement comprises application of at least one paint function in such a manner that:
a. those portions of the function which effect a first image are offset from those portions of the function which effect a second image;
b. where said offset is related to the depth at which said paint function is to be applied to said images;
c. where said first and said second image are displayed in combination in an interleaved fashion; and,
d. where the two offset portions of the visual representation of said paint function are displayed in an interleaved fashion.

77. An improved method for creating image information by using a computer image creation/modification system, wherein image creation/modification functions include at least one function available in standard computer paint systems including brush-oriented painting functions, wherein said improvement comprises storage of depth information in addition to standard image information and comprising, in addition, an improved method of presenting a Graphic User Interface on a computer system, which Graphic User Interface comprises at least one of a standard set of elements common to Graphic User Interfaces including: buttons, menus, palettes, slidebars, check boxes, frames and windows; where the improvement comprises displaying at least one of said elements in stereo scopic format.

78. A method as in claim 77 wherein said Graphic User Interface is employed as an interface to an animation system.

79. A method as in claim 77 wherein said Graphic User Interface is employed as an interface to a microprocessor-based windowing system.

80. A method as in claim 79 wherein said Graphic User Interface is employed in addition as an interface to visual programming language software.

81. A method as in claim 77 comprising in addition that said at least one of said elements in stereoscopic format comprises in addition a stereoscopic drop shadow.

82. An improved method for creating image information by using a computer image creation/modification system, wherein image creation/modification functions include at least one function available in standard computer paint systems including brush-oriented painting functions, wherein said improvement comprises storage of depth information in addition to standard image information and comprising, in addition, an improved method for operator input of scaler information to a computer system, wherein the improvement comprises interpretation of the input from a plurality of transducers which are used in two distinct modes one of which is in a coordinated fashion to specify values for a first set of variables and a second of which is in an anti-coordinated fashion to specify values for a second set of variables, and at least some of said variables are input to control at least some of said image creation/modification functions.

83. A method as in claim 6 providing a third mode of operation which mode is an uncoordinated mode whereby at least one first transducer receives null input and at least one second transducer receives input resulting in specification of a third set of variables.

84. A method as in claim 6 wherein the plurality of transducers comprises at least two translation transducers which when used in a coordinated fashion specify translation and when used in an anti-coordinated fashion specify rotation.

85. A method as in claim 82 comprising, in addition, an improved method for interpreting input from a device for the operator input of scaler information to a computer system, whereby the improvement comprises accumulating the input in one direction and ignoring input in the other direction.

86. A method as in claim 82, wherein the method is to be used to create/modify a multiplicity of images and it is desired to be able to display any of said multiplicity of images for creation, modification, review or presentation, said method comprising, in addition, an improved method for controlling the presentation of a multiplicity of ordered images as presented on a computer screen, wherein the improvement comprises interpreting input from a device for operator input of scaler information to a computer, such that the number of images skipped over between the currently displayed image and the next image displayed is directly dependent upon input from the device by utilization of a page flip paradigm.

87. An improved method for creating image information by using a computer image creation/modification system, wherein image creation/modification functions include at least one function available in standard computer paint systems including brush-oriented painting functions, wherein said improvement comprises storage of depth information in addition to standard image information and comprising, in addition, an improved method for operator input of scaler information to a computer system, wherein the improvement comprises interpretation of input from a plurality of rotational transducers at least one of which is used in at least two modes to specify in each of said modes a different variable of information.

88. A method as in claim 87 wherein the plurality of rotational transducers comprises two balls.

89. A method as in claim 87 wherein the plurality of rotational transducers comprises four balls at the corners of a square and one pivot ball in the center and where at least the four corner balls provide active input data.

90. A computer program stored on a computer readable medium comprising:
   a. instructions for performing computer paint system functions which include at least one function available in standard computer paint systems including brush-oriented painting functions, used for the creation of three-dimensional image information;
   b. instructions for maintaining a plurality of image information memories; and,
   c. instructions for applying at least one paint function to at least two of said image information memories, wherein the application of said at least one paint function in a first of said image information memories is offset with respect to the application of the same paint function in a second of said image information memories.

91. A computer program as in claim 90 additionally comprising:
   a. instructions for uniquely associating said plurality of image information memories each with at least one of a plurality of image information elements;
   b. instructions for creating left and right images by applying parallax offsets to at least some of said plurality of image information elements; and,
   c. instructions for determining said parallax offsets as a function of depth information associated with at least some of said image information elements.

92. A computer program as in claim 91 wherein said offsets may be adjusted by a fraction of a pixel for at least one image information memory value by further comprising instructions for applying interpolation to apportion said image information value to more than one image information display pixel.

93. An improved method for creating final image information by using a computer image creation/modification system, wherein image creation/modification functions include at least one function available in standard computer paint systems including brush-oriented painting functions, wherein said improvement comprises storage of image depth information in addition to image color information, and wherein each pixel of image color information has associated with it a unique pixel of image depth information, and wherein said at least one function produces dynamic visible feedback in the display of said final image information of its effect upon at least some of said image information during its operation.

94. A method as in claim 93 wherein said image final information is three-diminsional.

95. A method as in claim 93 wherein said image final information is stereoscopic.

96. A method as in claim 93 wherein the display of said final image information is effected by said stored image depth information.

97. A method as in claim 93 comprising in addition the creation or modification of depth information to be incorporated into said final image information.

98. A method as in claim 93 wherein said image depth information specifies other than a single plane perpendicular to the depth axis when depth excursions representing surface texture are eliminated.

99. A method as in claim 93 wherein obscuring of one image information element by another is based on said depth information.

100. A method as in claim 93 wherein an additional improvement comprises at least one function to paint with a brush that applies both color value to a color image memory plane and depth value to a depth image memory plane.

101. A method as in claim 93 wherein said depth information is sub-divided into depth tag and depth value information and the depth specification to be used is derived as a function of the depth tag and depth value.

102. A method as in claim 93 wherein an additional improvement comprises that for at least one image processing function a set of pixels input to said image processing function and a set of pixels effected by output of said image processing function are dependent upon depth information associated with at least some of said input and effected pixels.

103. A method as in claim 93 wherein an additional improvement comprises inclusion in said created image information of shadows cast by at least one first element onto at least one second element whereby a shadow casting function is calculated based upon said depth information.

104. A method as in claim 93 wherein an additional improvement comprises at least one function, such as 'painting a sheet of glass', that updates depth information plane values without updating color information plane values.

105. A method as in claim 93 wherein an additional improvement comprises at least one function, such as shape paint, that updates color information plane values without updating depth information plane values.

106. A method as in claim 93 comprising, in addition, an improved method for applying paint system brush-oriented functions, whereby for active/existing pixels within a brush shape, which brush shape is often, but not necessarily, a bounding rectangle, the value of the image under each brush pixel is replaced by some function of the brush pixel value, or its neighborhood, and the value of the image under the brush pixel, or its neighborhood; and whereby prior to affecting said replacement, for each active/existing pixel within the brush shape, various conditions must be tested for and met; which conditions include in any combination criteria of values for color, protection, depth, obscuration, alpha, transparency and any other image plane present in a specific computer paint system into which said improvement has been incorporated, for the brush pixel value, image pixel value or some combination of the two; which results in a necessity to perform as many as P×C tests where P is defined as the number of pixels within said brush shape, and C is defined as the number of conditions to be met for any pixel within said brush shape to maintain active/existing status; wherein the improvement comprises: maintenance of said brush as an array of pixel values and maintenance of a list of brush pixel address indices; and whereby non-active/non-existent pixels which are within the bounding shape do not appear on the list; and further manipulation of said list whereby when a pixel fails any one test which is critical said pixel is removed from said list and eliminated from consideration for subsequent tests of conditions to be met.

107. A method as in claim 93 comprising, in addition, an improved method for applying paint system brush-oriented functions, wherein the improvement comprises that during execution of at least some paint function an, image protection plane, of at least one bit, is maintained such that said image protection plane may be both written into and referenced during painting and whereby the action of the paint function on the image is adjusted based upon values already stored in said image protection plane.

108. A method as in claim 93 comprising, in addition, an improved method for applying paint system brush-oriented functions, wherein the improvement comprises application of image processing functions, which in standard practice are applied by a program to an entire image or within a bounding shape, including contrast correction, color correction, gamma correction, gain, offset, and math and logical functions, to pixels under a brush being used by an operator.

109. A method as in claim 93 comprising in addition the step of conveying at least some of said information via an information bearing medium.

* * * * *